(12) United States Patent
Karl

(10) Patent No.: US 9,297,891 B2
(45) Date of Patent: Mar. 29, 2016

(54) ULTRASONIC MEASUREMENT APPARATUS AND METHOD FOR EVALUATING AN ULTRASONIC SIGNAL

(75) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1002 days.

(21) Appl. No.: 13/383,164

(22) PCT Filed: Jul. 14, 2010

(86) PCT No.: PCT/EP2010/060114
§ 371 (c)(1),
(2), (4) Date: Mar. 27, 2012

(87) PCT Pub. No.: WO2011/009786
PCT Pub. Date: Jan. 27, 2011

(65) Prior Publication Data
US 2012/0176864 A1    Jul. 12, 2012

(30) Foreign Application Priority Data

Jul. 20, 2009    (DE) .................. 10 2009 027 842

(51) Int. Cl.
*G01S 15/58*    (2006.01)
*G01S 7/539*    (2006.01)
(Continued)

(52) U.S. Cl.
CPC ............... *G01S 7/539* (2013.01); *G01S 15/582* (2013.01); *G01S 15/931* (2013.01); *G01S 7/5276* (2013.01); *G01S 15/52* (2013.01)

(58) Field of Classification Search
CPC ......... G01S 7/527; G01S 7/539; G01S 15/93; G01S 15/52; G01S 15/58
USPC ............................................. 367/89; 701/301
See application file for complete search history.

(56) References Cited

U.S. PATENT DOCUMENTS

| | | | |
|---|---|---|---|
| 4,931,930 A | 6/1990 | Shyu et al. | |
| 2002/0003489 A1* | 1/2002 | Samukawa et al. | 342/70 |

(Continued)

FOREIGN PATENT DOCUMENTS

| | | |
|---|---|---|
| CN | 101158720 | 4/2008 |
| CN | 101454520 | 6/2009 |

(Continued)

OTHER PUBLICATIONS

International Search Report, International Application No. PCT/EP2010/060114, dated Oct. 7, 2010.

(Continued)

*Primary Examiner* — Luke Ratcliffe
*Assistant Examiner* — Amienatta M Ndure Jobe
(74) *Attorney, Agent, or Firm* — Kenyon & Kenyon LLP

(57) ABSTRACT

An ultrasonic measurement apparatus is described having a receiving device which determines a measurement sequence relating to a time variation of the period lengths of an ultrasonic signal received from an in-vehicle and/or external ultrasonic transmitter, a comparison device which determines a comparison information item relating to a deviation of the determined measurement sequence from at least one reference sequence, and an evaluation device which determines, taking into consideration the determined comparison information item, an information item relating to a signal form transmitted by the ultrasonic transmitter, a relative speed between the receiving device and the ultrasonic transmitter, a relative speed of at least one reflecting object situated in a transmission path between the receiving device and the ultrasonic transmitter, and/or a shape feature of the at least one reflecting object. A method for evaluating an ultrasonic signal is also described.

9 Claims, 12 Drawing Sheets

(51) Int. Cl.
*G01S 15/93* (2006.01)
*G01S 7/527* (2006.01)
*G01S 15/52* (2006.01)

(56) References Cited

U.S. PATENT DOCUMENTS

| | | | | |
|---|---|---|---|---|
| 2004/0117090 | A1* | 6/2004 | Samukawa et al. | 701/45 |
| 2007/0032953 | A1* | 2/2007 | Samukawa et al. | 701/301 |
| 2013/0312525 | A1* | 11/2013 | Kalbhenn | G01S 7/527 73/597 |

FOREIGN PATENT DOCUMENTS

| | | |
|---|---|---|
| DE | 266857 | 4/1989 |
| DE | 3813083 | 11/1989 |
| DE | 19634093 | 10/1997 |
| DE | 19716680 | 4/1998 |
| EP | 0898176 | 2/1999 |
| JP | 8-254576 | 10/1996 |
| JP | 9-281224 | 10/1997 |
| JP | 2002-372577 | 12/2002 |
| JP | 2006-232019 | 9/2006 |
| JP | 2007-3369 | 1/2007 |
| JP | 2009192133 | 8/2009 |

OTHER PUBLICATIONS

Masuhr, Berndt, "Wenn Autos den sechsten Sinn bekommen", Hamburger Abendblatt, Nov. 1, 2008 with English translation.

* cited by examiner

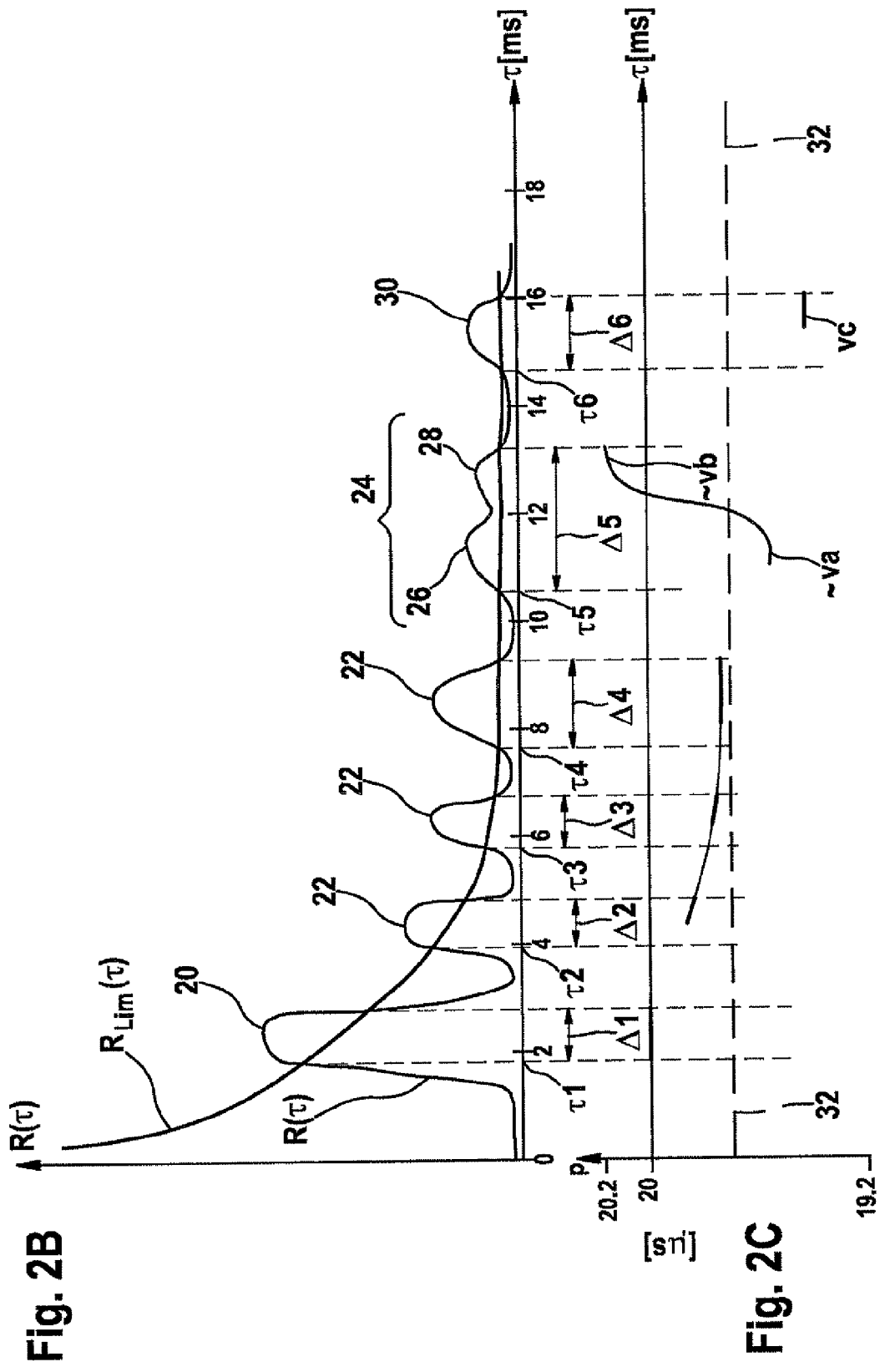

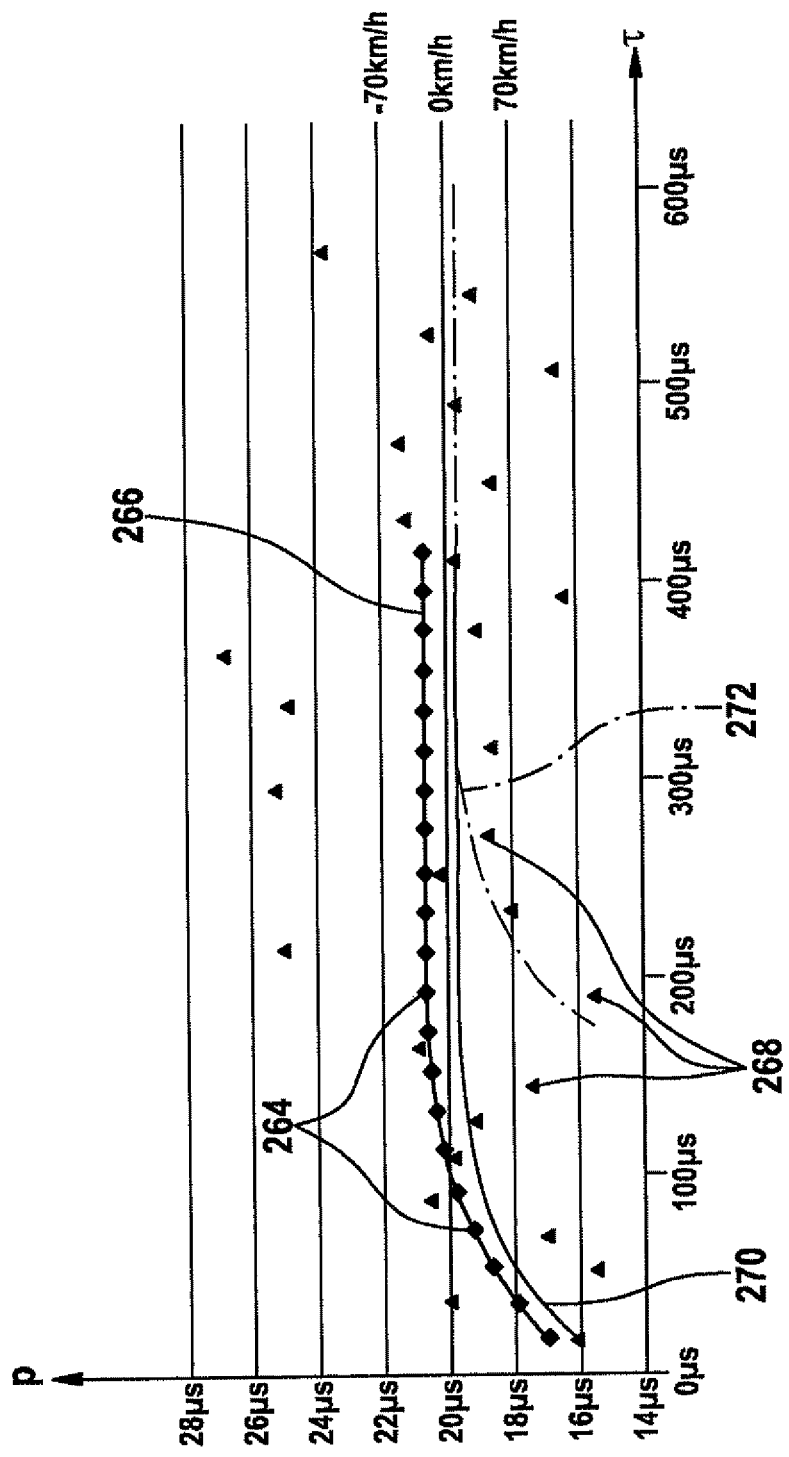

ULTRASONIC MEASUREMENT APPARATUS AND METHOD FOR EVALUATING AN ULTRASONIC SIGNAL

FIELD OF THE INVENTION

The present invention relates to an ultrasonic measurement apparatus. The present invention further relates to a method for evaluating an ultrasonic signal.

BACKGROUND INFORMATION

A vehicle often has an ultrasonic system for ascertaining a position of an object in an area surrounding the vehicle. Such an ultrasonic system is described in German Patent No. DE 38 130 83 A1. An ultrasonic system of that kind has at least one transmitting device and one receiving device mounted on the vehicle. In particular, the ultrasonic system may also include a plurality of transmitting and receiving devices distributed over the vehicle. The transmitting and receiving devices are normally built into a unit and use one and the same electroacoustic transducer, the diaphragm, as a bidirectionally actuated antenna device. In this case, the antenna device may be used both as transmitter and as receiver for an ultrasonic signal. Frequently, actuation of an ultrasonic system having a plurality of antenna devices takes place in such a manner that only few antenna devices emit an ultrasonic signal as the transmission signal at any one time. To avoid detection ambiguities, after emission of what is usually a pulse-form transmission signal, there is a waiting period, referred to as an echo cycle, before a next transmission pulse is emitted. The period of time required until all antenna devices of the ultrasonic system have sent a transmission signal at least once is frequently referred to as the transmission cycle of the ultrasonic system.

A transmission signal emitted by an antenna device is able to impinge on at least one reflecting object point and be reflected at least partially at that object point. An antenna device of the receiver then receives the reflected ultrasonic signal and ascertains the length of time between emission of the transmission signal and receiving of the reflected ultrasonic signal. An evaluation device of the ultrasonic system is then able to determine, on the basis of the at least one length of time ascertained, a position of the at least one reflecting object point in an area surrounding the vehicle.

SUMMARY

In accordance with the present invention, similarly to a finger print, a measurement sequence of period lengths of a received ultrasonic signal is in each case a characteristic both of the transmission pulse emitted and of the transmission path to the receiving device, the transmission path being determined, for example, by the directional characteristic of the emitting and/or receiving antennas and also by the objects at which the emitted pulses are reflected on their way to the receiving device and by their relative movement with respect to one another. If the evaluating device knows the finger print that is characteristic of a transmission scenario, and which is preferably represented by a sequence of reference period lengths, it is possible to detect on the receiver side which scenario existed in the case of a received ultrasonic signal.

Ultrasonic signals are zero-mean alternating signals and may therefore be described as a period length sequence of time-variant signal strength. The term period length may be understood as meaning the time segment of an ultrasonic signal between two successive zero crossings, which is frequently also referred to as a half-period lengths, or the length of time between two adjacent alternations from the negative/positive to the positive/negative signal state, also known as the positive/negative period length. Instead of the period length, an equivalent quantity may, however, also be determined and evaluated. It is expressly pointed out here that the measurement sequence ascertained may include a positive period length sequence, a negative period length sequence, a sequence of positive period length deviations from a positive reference period length sequence, a sequence of negative period length deviations from a negative reference period length sequence, a time-variable frequency and/or a time-variable frequency deviation from a reference frequency. As an alternative or in addition, the information may also include a period length or frequency quantity relating to a deviation of the at least one period length of the received signal. For example, the information is a positive and/or negative period length difference and/or a frequency difference between the received signal and the transmitted signal.

The example method may include, for example, a method for acquiring received-signal-inherent features of a measurement apparatus.

With the aid of the present invention, it is possible to determine a period length sequence and/or a time-variable frequency change with little expenditure in terms of time and effort. The period length and/or frequency change may then be utilized to ascertain at least one shape and/or speed feature of the reflecting object. With the aid of the at least one detected shape and/or speed feature, improved surround-sensing may be carried out. For example, using the relative speed determined, it is possible for a change in the strength of the received signal to be assigned to an object with greater probability. Equally, by determining the physical shape of the object, the object type may be better recognized. In the same manner, by using different transmission signals it is possible to transmit an item of information between a transmitting and a receiving ultrasonic device.

The present invention accordingly offers an intrapulse analysis for determining a relative movement, for performing object classification of the reflecting object and/or for differentiating between various transmitted signal forms.

In addition, with the aid of the present invention, it is possible to predict more precisely a probable reception time of an echo. The greater accuracy of measurement achieved in that manner may be utilized to shorten the reaction time and/or to increase the measurement coverage range. Furthermore, the items of object information obtained at different times within the transmission cycle of an ultrasonic system, such as, for example, distances of objects, may be standardized to a reference time point, whereby a more precise analysis of the object scene around a vehicle may be carried out. Furthermore, the accuracy of measurement and the reaction time may be additionally improved if transmission signals that are capable of being differentiated by the receiving device are emitted. By virtue of the present invention, the receiving device is able to recognize, on the basis of the time variation of a received signal, which signal form of a set of possible signal forms an emitted transmission signal possesses. In that embodiment of the present invention, the similarity of the received signal to the transmitted pulse is not checked or is not only checked on the basis of the signal strength, as in the conventional case. Instead, the embodiment makes it possible to establish a similarity of a time variation of a frequency and/or a period length of the received signal to the transmitted pulse. That ensures further system improvements, such as, for example, transmission with a lower pulse repetition rate and/or a pulse separation. Furthermore, an improvement in information transmission between a transmitting ultrasonic device and a receiving ultrasonic device in the case of vehicle-to-vehicle communication may be easily obtained in that manner.

A disadvantage with hitherto-customary methods for operating an ultrasonic system, which were directed purely to amplitude evaluation, is that it is not possible for relative movement of an object with respect to the ultrasonic system to be detected on the basis of a single echo. In measuring methods heretofore, determination of the relative speed of the object is possible only on the basis of an evaluation of the propagation time differences of a plurality of echoes of an object in successive transmission cycles. A significant source of measurement errors in that case is relative movement during a time interval between two successive transmission pulses. Owing to the relative movement, the reflection points at the object may change spatially in such a way that propagation time differences caused solely by the shifting of the reflection points occur, which are not the result of a relative movement. This frequently also leads to errors in assigning a received signal to a particular object.

Disproportionately high expenditure would be required if one wished to achieve the aim of assigning the received pulses to individual objects and/or transmission signal forms by calculating a cross-correlation of corresponding analog values with the received signal for every possible form of received pulse. The computation effort involved in a cross-correlation is high and is multiplied by the number of possible echo signals.

It is therefore desirable, in order to overcome the conventional limitations, to develop a method with which it is possible to predict the tendency of the temporal development of the reflection time points without an additional measuring procedure. In particular, it is desirable to have available a possible way of detecting the relative speed of the reflection points relative to the speed of the ultrasonic antenna apparatus fixedly disposed, for example, on a vehicle. This is possible through the present invention.

In particular, the present invention renders possible a simultaneous/time-parallel evaluation of positive and negative period lengths. In that manner, redundant evaluation results are obtained, which may be used for mutual plausibility checking. Plausibility checking may be carried out by assuming that, in the case of a virtually error-free measurement and evaluation of the positive and negative period lengths, the evaluation results obtained from the negative period lengths will correspond to the evaluation results obtained from the positive period lengths. At the same time, the evaluation results obtained from the intrapulse evaluation may be refined, for example, by averaging.

With the aid of the present invention, reflections at reflection points situated side by side in close proximity may also be better separated.

The high demands made on the ultrasonic measurement in terms of time accuracy, for example a measurement resolution of 0.16% per relative speed change of 1 km/h, are able to be met in the case of the example method of the present invention with relatively few demands on the measuring time base, especially by measuring over more than one period length.

The ultrasonic measurement apparatus according to the present invention and the corresponding method may be used, for example, for a safety system, a driver assistance system and/or for an informational and/or warning device. Examples of a suitable driver assistance system are an automatic braking, steering and/or acceleration system. A safety system preferred for the present invention is, for example, an airbag system, a raisable hood, a seat-belt pretensioner, a window lift and/or an active headrest.

The present invention therefore offers ultrasonic detection of an area surrounding a vehicle, including signal form recognition, object detection and/or relative movement estimation. In addition to the evaluation of the measurement sequence, it is also possible at the same time for evaluation of the time variation of the instantaneous signal strength to be carried out. Accordingly, it is possible to integrate conventional evaluation methods into the present invention.

The threshold switch possibly used in the ultrasonic measurement apparatus is able to output a threshold value that is variable with regard to the echo propagation time. As an extension of the determination of the measurement sequence, it is also possible for a plurality of measuring devices to operate in parallel time or in quasi-parallel time to establish a plurality of measurement sequences.

As possible signal forms of the received ultrasonic signal, carrier frequencies, single pulses, double pulses, direct-sequence pulses, chirp modulation and/or a frequency-hopping modulation are determinable with the aid of the present invention.

BRIEF DESCRIPTION OF THE DRAWINGS

Further features and advantages of the present invention are explained below with reference to the Figures.

FIG. 2A through C show an example of a possible application of the example ultrasonic measurement apparatus, FIG. 2A showing a traffic situation, FIG. 2B showing an intensity distribution with time of a received ultrasonic signal, and FIG. 2C showing the relative speeds of the other road users, ascertainable from the ultrasonic signal.

FIG. 11 shows a coordinate system to illustrate an evaluation of a period length in the case of a fourth application example of an embodiment of the ultrasonic measurement apparatus.

DETAILED DESCRIPTION OF EXAMPLE EMBODIMENTS

Figure 1A:
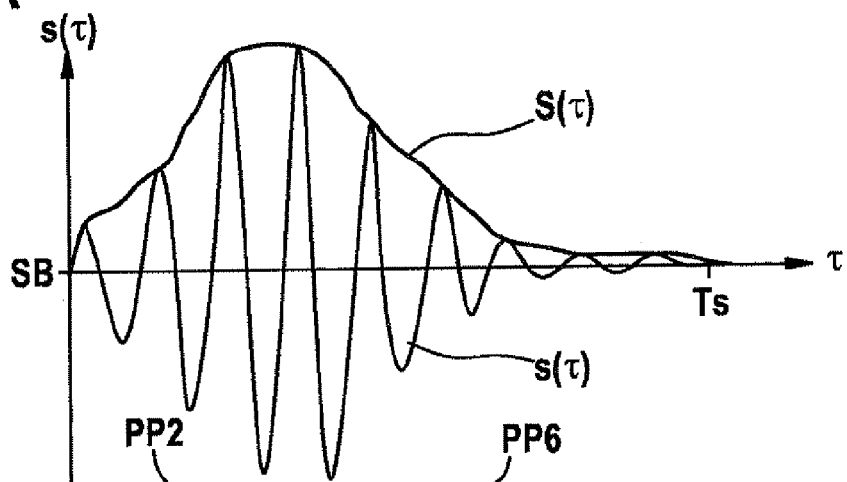
FIG. 1A through C show coordinate systems to explain the data evaluated for an intrapulse analysis, FIG. 1A showing a transmission signal, FIG. 1B showing positive period lengths, and FIG. 1C showing negative period lengths.
Figure 1B:
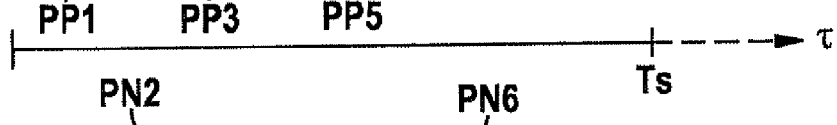
Figure 1C:

FIG. 1A through C show coordinate systems to explain the data evaluated for an intrapulse analysis, FIG. 1A showing a transmission signal, FIG. 1B showing positive period lengths, and FIG. 10 showing negative period lengths.

The abscissas of the coordinate systems of FIG. 1A through C are a time axis $\tau$. The ordinate of the coordinate system of FIG. 1A represents a transmission signal $s(\tau)$ emitted by a transmission device of an ultrasonic measurement apparatus. By contrast, the coordinate systems of FIGS. 1B and C have no ordinate.

Transmission signal $s(\tau)$ is an ultrasonic signal, for example a zero-mean band-pass signal. As a rule, the frequencies of transmission signal $s(\tau)$ are within a frequency band of a few kHz. The emission of transmission signal $s(\tau)$ takes place in a time interval between 0 and Ts. The pulse width of transmission signal $s(\tau)$ accordingly has the value Ts. Envelope $S(\tau)$ of transmission signal $s(\tau)$ is also entered in the coordinate system of FIG. 1A.

The frequency behavior of transmission signal $s(\tau)$ may be represented as a sequence of positive period lengths PP1-PP6 and/or as a sequence of negative period lengths PN1-PN6. Positive period lengths PP1 through PP6 reproduced in FIG. 1B and negative period lengths PN1 through PN6 shown in FIG. 1C contain mutually almost independent information about transmission signal $s(\tau)$ emitted by the transmission device of the ultrasonic measurement apparatus and are given by the variation with time of the transmission frequency of transmission signal $s(\tau)$.

The expression positive period length PP1-PP6 is to be understood as meaning a time interval between two successive crossings from a "smaller value" to a "greater value" of transmission signal $s(\tau)$ in relation to reference value SB. Correspondingly, a negative period length PN1-PN6 is to be understood as meaning the time interval between two successive crossings from a "greater value than SB" to a "smaller value than SB".

Further possible ways of representing the time variation of the instantaneous frequency of transmission signal $s(\tau)$ are a sequence of positive period length deviations from a positive reference period length and/or a sequence of negative period length deviations from a negative reference period length. For example, the positive reference period length, or the negative reference period length, is an average of the positive period lengths PP1-PP6, or of the negative period lengths PN1-PN6 respectively. Alternatively, the expression positive/negative period length may also be used as an equivalent to, for example, positive/negative half-period lengths, i.e., the time segment between the change from a smaller/greater signal value to a greater/smaller signal value than SB.

The frequency behavior of transmission signal $s(\tau)$ may also be represented as a sequence of frequencies and/or a sequence of frequency deviations from a reference frequency, for example by calculating the correspondingly reciprocal value. Accordingly, in the example embodiments of the present invention which are described hereinafter, instead of examining the positive period lengths PP1-PP6, the negative period lengths PN1-PN6, the positive period length deviations from a positive reference period length and/or the negative period length deviations from a negative reference period length, it is also possible to examine frequencies and/or frequency deviations from a reference frequency. It is, of course, also possible for the frequencies and/or frequency deviations from a reference frequency to be evaluated in addition to the values listed. Since, however, the relationship between a period length and a frequency is well understood, those embodiments will hardly be discussed here.

For greater clarity of expression, the following will refer only to a determination and an evaluation of period length deviations. A distinction will not be made between positive period lengths PP1 through PP6 and negative period lengths PN1 through PN6, or between their deviations. It is pointed out, however, that the mentioned period lengths may be understood as meaning positive period lengths PP1 through PP6, negative period lengths PN1 through PN6, positive period length deviations from a positive reference period length and/or negative period length deviations from a negative reference period length. The expression period length deviations is thus a synonym for the various forms of representation of one and the same effect.

The period lengths of transmission signal $s(\tau)$ emitted by the transmission device of the ultrasonic measurement apparatus are already modified on reflection at an individual object point moving relative to the ultrasonic measurement apparatus at a relative speed not equal to zero, and/or at a relative speed not equal to zero between an in-vehicle transmitter, the object point and an in-vehicle receiver. The signals may also be altered on their way between the transmitter and the receiver by overlapping of the reflections from various reflection points of an object and/or as a result of the transmission properties of the antennas and/or of the propagation medium. Furthermore, it is possible to use a plurality of transmission signals that differ inter alia in the time variation of the period length/instantaneous period length of the transmission signal. As a result, the period lengths of the received signal received by a receiving device of the ultrasonic measurement apparatus may assume values other than the emitted period lengths of transmission signal $s(\tau)$. In addition, it is pointed out here that an object shape of a reflecting object may also give rise to modified period lengths of the reflected ultrasonic signal. By evaluation of the period lengths of the received ultrasonic signal it is thus possible to obtain, in addition to at least one relative speed, also information about an object shape, and hence about an object type. Equally, other kinds of information may be transmitted from a transmitting device to a receiving device.

Using the example method of intrapulse analysis described hereinafter, which is preferably carried out as signal-strength-weighted intrapulse analysis, it is possible, with relatively little additional expenditure, to filter those effects out of the received signal and use them as items of information for the driver's information, for assisting the driver in steering, accelerating and/or braking, for parameterization and/or for operating equipment for reducing the effects of accidents.

For example, in the received signals, the sequence of period length deviations is examined in relation to at least one reference, preferably in the portion of the received signal having a high signal strength. The more detailed procedure of intrapulse evaluation will be described hereinafter with reference to examples.

Figure 2A:
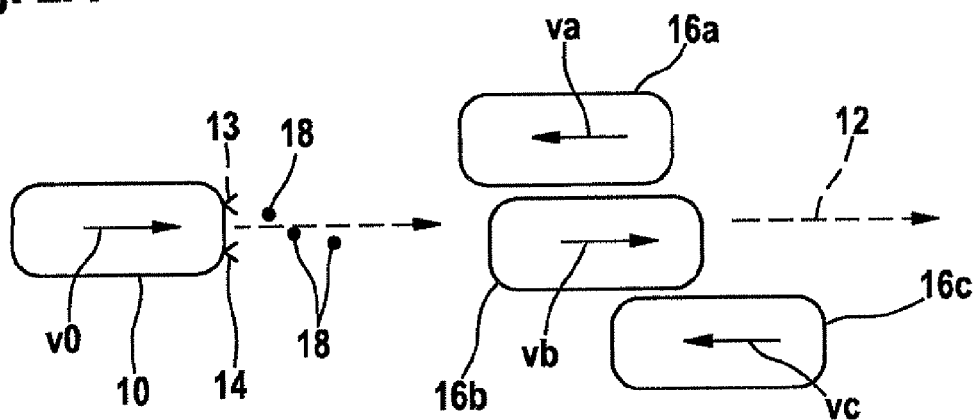

FIG. 2A through C show an example of a possible application of the ultrasonic measurement apparatus, FIG. 2A showing a traffic situation, FIG. 2B showing an intensity distribution with time of a received ultrasonic signal, and FIG. 2C showing the relative speeds of the other road users, ascertainable from the ultrasonic signal.

In the traffic situation reproduced schematically in FIG. 2A, a vehicle 10 is traveling at a speed v0 in a direction of travel 12. Vehicle 10 is equipped by way of example with an ultrasonic measurement apparatus having transmitting and receiving devices 13 and 14. Transmitting and receiving devices 13 and 14 are fastened to vehicle 10 in such a manner that the ultrasonic signals emitted by transmitting device 13 impinge on the part of the surroundings in front of vehicle 10 in direction of travel 12. When emitting the ultrasonic signals, the at least one transmission device 13 may have a sufficiently large aperture angle for good coverage of the part of the surroundings in front of vehicle 10 in direction of travel 12.

The disposition of a transmitter 13 and a receiver 14 shown in FIG. 2A is to be understood as being merely an example in order to give a simple explanation of the principle. Attention is specifically drawn at this point to the known fact that, these days, conventional ultrasonic transducers situated at one and the same position may alternately take on the function of transmitter 13 and receiver 14 and that usually more than two ultrasonic transducers are installed on a vehicle 10.

Such measurement apparatuses based on ultrasound are comparatively inexpensive to produce. They are relatively robust toward fouling by dirt. In addition, the operability of an ultrasonic measurement apparatus has a low sensitivity to climatic effects, such as darkness, fog, rain and snow.

In the traffic situation illustrated, vehicles 16a, 16b and 16c are in front of vehicle 10 in direction of travel 12. Vehicles 16a, 16b and 16c are therefore within the measuring range of transmitting and receiving devices 13 and 14. Each of vehicles 16a through 16c has a different relative speed va, vb or vc relative to vehicle 10. Whereas vehicle 16b is also traveling in direction of travel 12 at relative speed vb, vehicles 16a and 16c are traveling, at their respective speed va or vc, counter to direction of travel 12.

Each of vehicles 16a, 16b and 16c reflects a proportion of the ultrasonic signals emitted by the at least one transmitting device 13 back to vehicle 10. As will be explained in more detail hereinafter, in FIG. 2A vehicles 16a and 16b are so close to each other that their reflections overlap to give a total reflection that is not divisible on the basis of the intensity distribution. This is frequently the case if a plurality of objects are at approximately the same distance from vehicle 10.

A proportion of the emitted ultrasonic signals is also reflected at the road on which vehicle 10 is traveling. This is represented schematically by ground obstacles 18 lying between vehicle 10 and vehicles 16a through 16c.

There follows an explanation of how the traffic situation illustrated may be sensed by evaluation of the reflected ultrasonic signals.

A coordinate system shown in FIG. 2B has as the abscissa time axis τ and as the ordinate an intensity variation R(τ) of a received echo of the ultrasonic signal emitted by at least one transmitting device. The total period of time shown over time axis τ is, for example, 18 ms. In addition to the ascertained intensity distribution with time R(τ) of the echo, a (time-variable) significance threshold RLim(τ) is also reproduced in the coordinate system, which decreases exponentially, for example after emission of an ultrasonic signal at time τ=0. Of the intensity distribution R(τ), preferably only above-threshold regions 20 through 30, which lie above significance threshold RLim(τ), are considered for the evaluation. Preferably, a time-variable significance threshold RLim(τ) is used. As an alternative to time-variable significance threshold RLim(τ), however, a time-constant threshold value may also be used.

Preferably, in the intrapulse analysis of ultrasonic driver assistance systems, the change in the time variation of the period lengths of the received pulse relative to a reference time variation is evaluated, in particular, only at high signal strengths of the received signal. In such a signal-strength-weighted instantaneous period length evaluation, for every above-threshold region 20 through 30, the associated period length p is determined by a procedure described hereinafter. The ordinate of the coordinate system of FIG. 2C gives the values of the determined instantaneous period lengths p of above-threshold regions 20 through 30. The abscissa of the coordinate system of FIG. 2C is time axis τ. FIG. 2C shows how, for example as a result of the Doppler effect, the period lengths p of the ultrasonic signals reflected at objects 16a through 16c and 18 are altered. In the case of the example illustrated, the period lengths p determined are in a value range of between 19.2 µs and 20.2 µs.

In the case of the example described here, the ultrasonic measurement apparatus is configured to emit ultrasonic signals of an almost constant instantaneous period length p of 20 µs. As mentioned hereinafter, however, other time variations of the instantaneous period lengths of the transmission signal are possible, especially for the purpose of distinguishing between various signal forms. Furthermore, the ultrasonic measurement apparatus has an evaluation device which is configured to continuously ascertain speed v0 of vehicle 10 relative to the roadway and calculate a reference signal 32 corresponding to speed v0. Reference signal 32 corresponds in this case to the Doppler shift of a reflection at an object moving at speed v0. In FIG. 2C, reference signal 32 lies at approximately 19.7 µs. The value of the reference signal is given here by way of example by the relative speed of the vehicle over the ground.

From time τ1, crosstalk 20 is received as above-threshold region 20 for a time period Δ1. Above-threshold region 20 has an instantaneous period length p equal to the emitted ultrasonic signal and by that fact is clearly recognizable as crosstalk between two sensors 13 and 14 moving at relative speed 0, provided that its echo propagation time τ1 corresponds to the spacing of the two sensors 13 and 14 at the current sound velocity.

At times τ2 through τ4, ground echoes 22 reflected at ground obstacles 18 are received as above-threshold regions 22 for time periods 62 through Δ4. Ground echoes 22 have instantaneous period lengths p lying within a value range between period length p of the emitted ultrasonic signal and reference signal 32 corresponding to speed v0 of the vehicle. The deviations between period lengths p of ground echoes 22 occur as a result of the ultrasonic measurement apparatuses "looking at" the ground at an oblique angle. On the basis of those features, it is possible for ground echoes 22 to be more easily recognized as ground echoes 22 and filtered out in the intrapulse analysis of the variations of the instantaneous period lengths.

From time τ5, in a time period Δ5 an overlapping received signal 24 is received which is made up of reflected signal 26 of vehicle 16a and reflected signal 28 of vehicle 16b. A great advantage of the ultrasonic measurement apparatus described herein is that it is able to recognize, on the basis of the time variation of the instantaneous period length of the received signal, that received signal 24 is made up of the two individual signals 26 and 28. To do this, the ultrasonic measurement apparatus examines the time variation of instantaneous period lengths p of received signal 24 with regard to the change relative to the emitted signal and, in so doing, recognizes that two relative speeds va and vb may be assigned to the time variation of the instantaneous period lengths p of received signal 24 (see FIG. 2C). The ultrasonic measurement apparatus accordingly recognizes that two different objects with differing relative speeds va and vb may be assigned to received signal 24. For example, by recognizing that received signal 24 does not indicate the position of a compact single object, but indicates the positions of two different objects with differing relative speeds va and vb, an accident situation may be recognized and prevented in good time.

That is a considerable advantage of the ultrasonic measurement apparatus described herein over a conventional ultrasonic system. By analysis of the at least one instantaneous period length p (or the at least one instantaneous frequency) of the received echo, such a spatial overlapping of the objects may be recognized and eliminated for the evaluation of the received signals. It is especially easy for the objects to be differentiated if they differ from one another in their relative movement with respect to the observer. For example, vehicles 16a and 16b are clearly distinguishable from each other on the basis of their differing relative movements by evaluation of instantaneous period length p. With the aid of the evaluation of instantaneous period length p it is thus possible to obtain from an echo considerably more precise information about the current traffic situation.

A conventional ultrasonic system determines the objects in the area surrounding a vehicle merely taking account of the times of the determined above-threshold regions 20 to 30. Conventional ultrasonic systems are equipped merely to establish, on the basis of decision threshold $RLim(\tau)$ being exceeded, whether a received above-threshold region 20 through 30 of the echo is to be assigned to an object. Accordingly, in the case of a conventional ultrasonic system, object classification is limited to an analysis of the echo strength (intensity distribution $R(\tau)$). Several echo cycles are required, therefore, to recognize relative movement of an object with respect to vehicle 10. If, in the case of high coverage ranges, echo ambiguity is to be avoided, a large echo settling period is required. Particularly in the case of fairly great relative speeds, however, that entails an increase in the probability that the transmission cycle of the system will last too long for those rapid relative speeds to be determined reliably.

Moreover, conventional ultrasonic systems are frequently unable to differentiate objects that are side by side in close proximity to each other (vehicles 16a and 16b) on the basis of the intensity distribution $R(\tau)$ of the echo. Accordingly, no reliable assignment of an above-threshold region of the echo to a specific object is possible. Often, it is also not possible to solve that problem by the use of a plurality of thresholds. Conventionally, objects lying side by side in close proximity to each other may therefore be separated only with the aid of further echo information, such as, for example, by using a direct echo, evaluation of the echoes of further sensors and/or by repeated transmission (preferably by sensors disposed at other locations on the vehicle). Particularly in cases where objects are at a relatively great distance away, differentiation is not, however, possible as a rule.

The ultrasonic signal reflected at vehicle 16c is detected as received signal 30 from time τ6 for time period Δ6. It is also possible for a relative speed to be ascertained for above-threshold region 30. The relative speeds va, vb or vc ascertained may be in a range that clearly differs from a typical speed of a pedestrian and/or bicyclist. Accordingly, an object type may often already be assigned to the relevant objects on the basis of the relative speeds va, vb or vc ascertained. For example, in the example under consideration, the ultrasonic measurement apparatus is configured to establish that received signals 26, 28 and 30 represent with a high probability the positions, shapes and/or speeds of vehicles 16a, 16b and 16c.

Particularly in complex situations, knowledge of the relative movement of an object permits its supposed location in the subsequent echo cycles to be determined more exactly and, by comparison of those predictions with the actual echo propagation times occurring in the subsequent echo cycles, it is possible to plausibilize the object models including the movement models.

Furthermore, on the basis of the echo propagation times and relative movements determined in the spatially different sensor constellations and at different points in time, each reflection point may be converted to a reference time point of a spatial reference coordinate system in order in that manner to obtain an overall picture of the object scene in a common reference.

If transmission signal pulses of various types are used by the transmitting sensors of such a system, an item of information, such as the time of transmission, site of transmission, a sensor identification, information regarding the operating characteristics of one's own vehicle, and/or information about the surroundings, may be transmitted between the transmitting and receiving sensors.

The intensity distribution $R(\tau)$ shown by way of example in FIG. 2B and the received-signal-strength-weighted period length p shown in FIG. 2C correspond to the traffic scene signal emitted by transmitting device 13 and subsequently received by receiving device 14.

Ultrasonic signals have a comparatively low propagation velocity. As a result, the transmission cycle of a conventional ultrasonic system with a plurality of antenna devices is relatively long. Furthermore, with increasing measurement distance, the measuring cycle becomes longer for a reliable observation of the object scene. This means that information about a position of the reflecting object points within an area surrounding the vehicle may be determined by a conventional ultrasonic system only with a relatively large interval between the individual measurements. In conventional ultrasonic systems, therefore, the frequency with which reliable updated information may be determined from the object scene is severely limited.

Since the reflecting object points are frequently moving relative to the vehicle, the large interval between the individual measurements makes it difficult for the features ascertained at various times to be assigned to an individual object with a conventional ultrasonic system. Hence, the uniqueness condition involved in the assignment is only inadequately met in the case of a conventional ultrasonic system. In particular, owing to the restricted frequency with which a current position of a reflecting object point is ascertained, conventional ultrasonic systems are only of limited suitability for determining a speed of a reflecting object within the surroundings of a vehicle on the basis of changing distance information. This severely limits the possibilities of using a conventional ultrasonic system, particularly for an automatic vehicle control system.

Moreover, when a conventional ultrasonic system is used, there is often the problem that individual reflections from a plurality of object points, which are offset in their propagation time, result in overlaps in the total reflection signal. Such overlapping of individual reflections occurs, for example, when a transmission signal is reflected at a plurality of objects and/or at an uneven surface of an individual object. Depending on the relative phase positions of the individual reflections resulting from the propagation time differences, the overlaps may cause amplification, reduction or obliteration of the total reflection signal. The overlapping of individual reflections thus makes it more difficult to establish reliable position and speed data or to determine the shape of an object with the conventional ultrasonic system.

Those adverse effects on function may, however, be eliminated by way of the ultrasonic measurement apparatus described herein.

Figure 3:
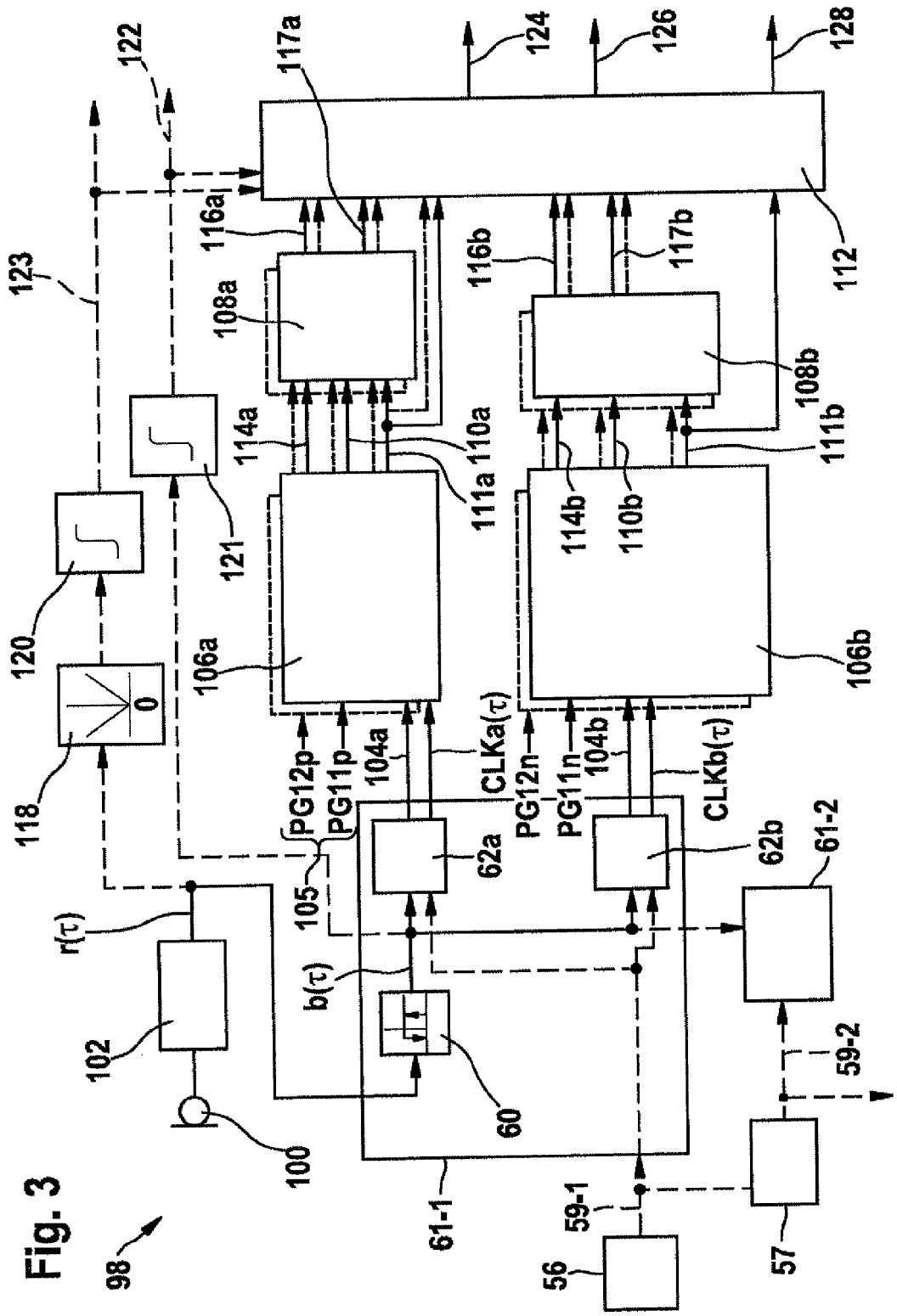
FIG. 3 shows a block diagram to illustrate a circuit device of a first embodiment of the ultrasonic measurement apparatus.

FIG. 3 shows a block diagram to illustrate a circuit device of a first embodiment of the ultrasonic measurement apparatus. Representation of the transmitters is dispensed with in the circuit device 98 shown schematically in FIG. 3 since, besides knowledge of the form of the transmission pulse(s), as explained with reference to FIG. 1, the intrapulse analysis described below takes place exclusively in the receiving path.

Circuit device 98 reproduced schematically includes an electroacoustic transducer 100 with which a received ultrasonic signal is converted, for example, into a received electrical signal. The received signal is then outputted to a signal processing unit 102. For example, signal processing unit 102 contains an amplifier and/or a band-pass filter for filtering out undesired signal components and/or frequency response correction. Signal processing unit 102 provides at its output (processed) received signal r(τ).

The intrapulse analysis includes per measuring time range at least one measuring device 61 for determining the instantaneous period length deviation Δp or a corresponding equivalent value, optionally followed by at least one device for evaluating instantaneous period length deviation 106 per sequence of reference period length deviations PG 105 or on the basis of a corresponding equivalent reference sequence, such as, for example, the instantaneous frequency deviation optionally followed in each case by a device for quality-level-based signal processing 108 and followed by at least one device for ultimate signal decision 112.

Circuit device 61 reproduced schematically in FIG. 3 is configured to ascertain an instantaneous period length deviation Δp of a received signal r(τ) from a predefined reference period length. Circuit device 61 may also be modified in such a way that instead of an instantaneous period length deviation Δp being ascertained, a period length, a frequency and/or a frequency deviation from a predefined reference frequency are ascertained. Equally, instantaneous period length deviations Δp ascertained by circuit device 61 may also be converted into a period length, a frequency and/or a frequency deviation.

It is also possible for a plurality of measuring devices 61 to be started at staggered times and to measure an average period length deviation over a plurality of (half-)periods in each case. In one evaluation circuit or in a plurality of evaluation units connected downstream, a finite-length reference sequence of period length deviations may be compared in each case with segments of correspondingly equal length from the sequence of measured instantaneous period length deviations. In that operation, there is first determined, for example, an average for the deviation of the respective pairs of values. Optionally, a rough measure of the spread of the deviation of the respective pairs of values of the sequences may also be determined. Equally, a quantity that describes which pairs of values of the sequences respectively compared with each other differ from each other to a particularly great extent may be formed and evaluated.

With every measuring device 61-1, 61-2, . . . a measure of instantaneous period length deviation Δp 104 is determined from the processed received signal r(τ) for each time-staggered measuring time range −1, −2, . . . and according to whether the direction of the level change is or is not Measured separately as positive and negative instantaneous period length deviation, and is transferred to the subsequent unit with the transfer preferably being synchronized by clock signal CLK. The measuring time range of each measurement is started with a respective start signal 59-1, 59-2, . . . . In the case of simultaneous measurement in a plurality of time-staggered measuring time ranges, start signals 59-1, 59-2, . . . are to be delayed with respect to one another by clock time base 56 and suitable signal delays 57 or equivalent clock generators.

Simultaneous measurement in mutually time-staggered measuring ranges over one or more period lengths in each case admittedly requires a plurality of simultaneously operating measuring devices, but on the other hand it permits lower demands on the reference time base for determining the instantaneous period length deviation than in the case of measurements over only one half-period or period of the ultrasonic signal.

Since the stages for time-staggered measurement are of the same type in structure apart from the time-delayed start signal 59-2, 59-3, . . . , those stages are indicated in the lower portion of FIG. 3 merely by way of example, using 61-2.

Block 61-1 consists in the case illustrated of two measuring devices a and b for time-staggered measurement of a positive and a negative instantaneous period length deviation 104a-1 and 104b-1 and, in the particular case illustrated, all measuring devices 62a-1, 62a-2, . . . , 62b-1, 62b-2, . . . share a threshold switch 60, whereby additional expenditure may be avoided.

In a preferred embodiment, the synchronization of the measuring devices is generated directly from the binary signal b(τ) which accordingly also takes on the function of synchronization signal 59.

In another preferred, simplified embodiment, for every receiving stage there is only one measuring device for measuring the positive and for measuring the negative instantaneous period length deviation 104a and 104b, and therefore no additional delay stage 57 is required. For example, this device measures the instantaneous period length deviation of the positive and negative half-periods in succession, and the subsequent device(s) 106a-1, 106a-2, . . . , 106b-1, 106b-2, . . . , . . . evaluate(s) those sequences as described in detail below.

In a very simple embodiment of the intrapulse analysis, the current value of instantaneous period length deviation 104 is in each case taken directly from decision stage 112.

Received signal r(τ) is outputted to a threshold switch 60 for conversion of received signal r(τ) into a binary signal b(τ). Threshold switch 60 establishes at what amplitude of received signal r(τ) binary signal b(τ) is outputted with the two levels "low" and "high". Preferably, the threshold value of the threshold switch should be identical to threshold value RLim(τ), especially to obtain synergies for minimizing expenditure with other functions in the receiver circuit. Binary signal b(τ) is provided on a first and on a second evaluation path.

Each of the two evaluation paths has at its start a circuit 62a or 62b. Circuit 62a is configured to ascertain on the basis of binary signal b(τ) positive instantaneous period length deviations 104a from a predefined positive reference period length. Correspondingly, circuit 62b is configured to determine on the basis of binary signal b(τ) negative instantaneous period length deviations 104b from a negative reference period length. The time measurement for determining a positive and a negative instantaneous period length deviation is preferably carried out by evaluating a low-to-high level change or a high-to-low level change. Extreme instantaneous period length deviations may already be filtered out by the two circuits 62*a* and 62*b* in this case, for example by establishing a range of valid measured values beforehand and having non-compliance indicated by circuits 62.

If the received signal is be examined with the aid of the intrapulse analysis to ascertain which of the various possible transmission signals and/or objects have led to the received signal and if this is also to be done, where applicable, when using a plurality of measuring devices 61*a*-1, 61*a*-2, . . . , 61*b*-1, 61*b*-2, . . . , then each of instantaneous period lengths 104 . . . is to be compared, in a block 106 in each case, with the references PG . . . 105 that are representative of the possible different transmission signals and/or objects. In each instance, as a result of such a comparison, the raw average period length deviation $\Delta$prr of a sequence of instantaneous period length deviations with respect to a reference sequence PG . . . in each case is transferred to the following step.

In addition to raw average period length deviation $\Delta$prr, device 106 optionally generates per clock cycle a pattern vector $\epsilon$, which describes the way in which the sequence of instantaneous period length deviations currently being examined deviates from reference sequence PG 105, and describes a raw measure or of the spread of the average. All three quantities $\Delta$prr, $\epsilon$ and $\sigma$r are passed to the following device via data lines 104, 110.

In the step for quality-level-based signal processing 108, which optionally follows in each case, a result assessment is preferably carried out per clock unit on the basis of the intermediate quantities $\Delta$prr, $\epsilon$ and $\sigma$r.

Ideally, at the time received, deviation vector $\epsilon$ reveals that the measured sequence of instantaneous period length deviations does not differ from the sequence of reference period length deviations PG, except for a constant value $\Delta$prr, and also that the quantity for the average deviation or has a great similarity to the two sequences at that point in time, with the result that the stage for quality-level-based signal correction does not need to make any correction at that point in time and the subsequent decision device 112, given a sufficiently great signal strength 123 and signal duration 122, is then able to relay that at that point in time a signal pulse similar to reference PG, with a relative movement corresponding to the period length offset $\Delta$prr, was received. If decision in 112 takes place by evaluation of the comparisons with a plurality of references PG . . . , then a reference represents at least a signal form and/or an object, whereby in 124, in addition to the relative movement, information about the detected signal form and/or type of object is communicated.

In all other situations differing from that ideal case, the stage for quality-level-based signal processing 108 processes the raw intermediate values with correction, as described, for example, hereinafter.

If the ideal case described above does not occur and if, at a high echo strength, none of the deviation quantities a representing the comparisons taking place side by side to compare the instantaneous period length deviations with references PG . . . is sufficiently small, decision unit 112 is able to relay that the currently high reception strength does not correspond to any of the references or alternatively that the currently high reception strength is most similar to that reference PG whose deviation quantity $\sigma$ is the smallest in comparison with the others. Which of those two types of information may be decided, for example, on the basis of the magnitude of the deviation quantities $\sigma$ of the partial analyses.

The positive instantaneous period length deviations ascertained by circuit 62*a* are provided as data signal 104 together with a clock signal CLK($\tau$) to an arithmetic unit 106*a*. Arithmetic unit 106*a* standardizes the incoming sequence of measured instantaneous period length deviations on the basis of a sequence of reference period length deviations PG in each case and is configured to determine an average positive instantaneous period length deviation, the individual instantaneous period length deviations and/or the sum of the spreads of the instantaneous period length deviations. The values calculated by arithmetic unit 106*a* are then outputted as data signal 110 to an evaluation device 108*a*.

Device for signal processing 108*a* performs a signal processing operation on the basis of the raw values applied to its input, by determining, on the basis of the forwarded quality levels, the final values for the average period length deviation $\Delta$pr calculated in that clock unit and standardized to the respective reference sequence, or an equivalent value calculated therefrom, such as, for example, the relative speed, and/or a processed quantity $\sigma$ that describes the probability with which the sequence of measured instantaneous period length deviations compared with the respective reference sequence in the respective partial analysis is identical. Evaluation device 108*a* may in that case be configured to determine an optimized average positive instantaneous period length deviation and/or an optimized sequence of positive instantaneous period length deviations by filtering out positive instantaneous period length deviations whose average positive instantaneous period length deviation and/or spreads deviate too greatly from a predefined comparison value, and to output the optimized average positive instantaneous period length deviation and/or the optimized sequence of positive instantaneous period length deviations as data signals 110 to decision unit 112.

The negative instantaneous period length deviations determined by circuit 62*b* are outputted as data signal 104*b* together with a clock signal CLK($\tau$) to an arithmetic unit 106*b*. The function of arithmetic unit 106*b* corresponds to the function of arithmetic unit 106*a* already described. An evaluation unit 108*b* having the function of evaluation unit 108*a* is also connected downstream of arithmetic unit 106*b*. The values calculated by arithmetic unit 106*b* are outputted as data signals 110*b*, 111*b* and 114*b* to evaluation device 108*b* and, provided that the negative instantaneous period length deviations correspond to a predefined estimated quality, are forwarded to decision unit 112, where applicable after processing in the stage for quality-level-based signal processing 108*b*.

In addition to the components for ascertaining and evaluating the period length deviations, circuit device 98 may also have further components 118 and 120. This is represented by the dashed lines of FIG. 3. Components 118 and 120 are, for example, rectifier 118 and integration filter 120 and generate an item of information about instantaneous signal intensity 123. Components 118 and 120 may be configured to evaluate the provided received signal r($\tau$) with regard to an intensity distribution of the echo with time in a conventional manner (see FIG. 2B). In that manner, it is possible to roughly determine a position of a reflecting object point relative to the ultrasonic measuring apparatus. Signals 122 and 123 ascertained by components 118 and 120 may also be outputted to decision unit 112.

As already described above, each combination of type of possible transmission signal, type of transmission path, and type of reflecting object may necessitate its own reference sequence of possible instantaneous period length deviations PG . . . 105, so that for each of the respective reference sequences a partial analysis, consisting of comparison unit 106 and optionally a unit for quality-based signal processing 108, may be necessary. The expenditure required may, as in the case shown in FIG. 3, be multiplied by the number of measuring devices 61 operating parallel in time if the received signal is to be analyzed separately according to positive and negative period lengths and/or over a plurality of period lengths in each case. The individual hypotheses of the various partial analyses obtained in that manner and based on the respective reference sequences PG . . . are thereafter provided to signal decision unit 112 for description of the most probable reception hypothesis at the respective point in time regarding the combination of the transmitted signal, the underlying changes in the transmission path and therewith, optionally, the type of reflecting object.

Accordingly, decision unit 112 is configured to determine, for example, in respect of the respective position, a relative speed and optionally a type of object in an area surrounding the ultrasonic measurement apparatus. It is also able to recognize on which signal form the respective received signal was based.

Decision unit 112 may also be configured to recognize a shape of the at least one object. In particular, the decision unit may be configured to detect a surface structure of the at least one reflecting object. On the basis of the shape/surface structure recognized and the relative movement, decision unit 112 is also able to recognize which types of object are in the area surrounding the ultrasonic measurement apparatus. For example, decision unit 112 distinguishes between an adult, a child, an animal, a stationary structure, such as a wall, and or a flexible and moving object, such as a bicycle.

As an alternative or in addition, decision unit 112 may also be configured to establish which signal form of a set of possible signal forms was transmitted by a transmitting device of the ultrasonic measurement apparatus and then reflected by an object in the area surrounding the ultrasonic measurement apparatus. A more detailed description of that procedure is given below with reference to an example.

Furthermore, decision unit 112 may be configured to standardize the propagation time of all echoes of a transmission cycle to an observation instant in each case, on the basis of an estimated object shape and/or an estimated direction of movement. It is also possible to obtain a better prediction of an expected range of the echo propagation time of a reflecting object for the subsequent transmission cycles by recognition of the object shape and the direction of movement. An object in the area surrounding the vehicle may thus be determined and evaluated with regard to its speed and/or object shape in a more targeted manner.

The position data, speed data, object shape data, object surface data, object type data, object assignment data and/or transmission signal form data ascertained by decision unit 112 may be forwarded as information signals 124, 126 and 128, for example to an automatic vehicle control system, such as, for example, an automatic braking, steering and/or acceleration system.

As an alternative to circuit device 98 illustrated, circuits 62a and/or 62b may also be time-measuring devices which measure a quantity equivalent to the period length deviation, such as, for example, a period length and/or a frequency (with the aid of a frequency voltage converter) and/or a frequency deviation. As signal forms it is possible to use modulation methods, such as single-pulse, direct-sequence pulse, chirp and frequency-hopping methods.

It is pointed out once again that, instead of only two time-measuring devices, several time-measuring devices may also be started at staggered times and thereby measure an average period length deviation in parallel over several (half-)periods. In one evaluation unit or in a plurality of evaluation units connected downstream, a finite-length reference sequence of period length deviations may be compared in each case with segments of correspondingly equal length from the sequence of measured period length deviations. In that operation, there is first determined, for example, an average for the deviation of the respective pairs of values. Optionally, a rough measure of the spread of the deviation of the respective pairs of values of the sequences may also be determined. Equally, a quantity that describes which pairs of values of the sequences respectively compared with each other differ from each other to a particularly great extent may be formed and evaluated.

Figure 4:
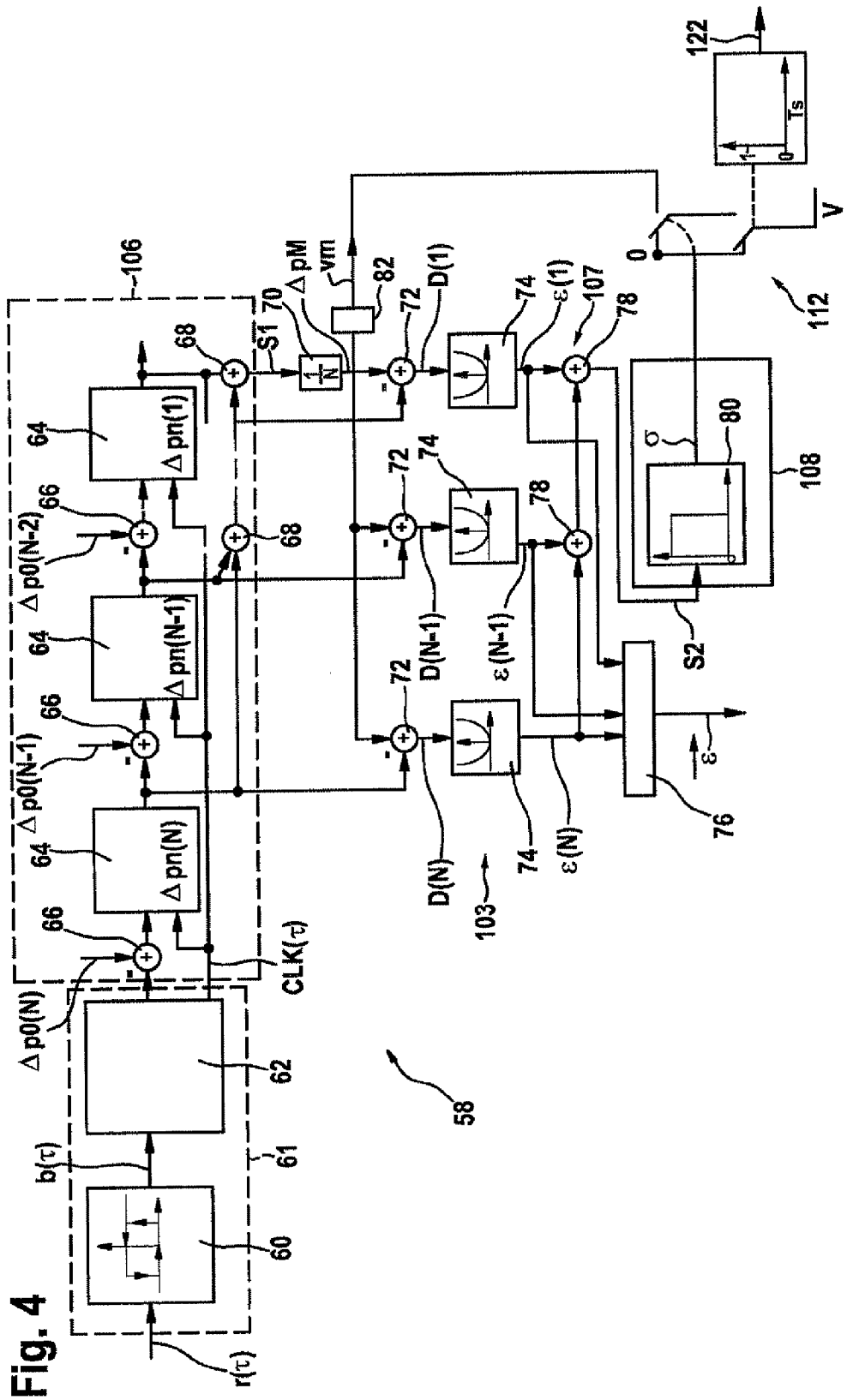
FIG. 4 shows a block diagram to illustrate a circuit device of a second embodiment of the ultrasonic measurement apparatus.

FIG. 4 shows a block diagram to illustrate a circuit device of a second embodiment of the ultrasonic measurement apparatus. Circuit device 58 illustrated shows a concrete form of realization of the signal analysis described in the preceding circuit device, with exactly only one measuring device 61 and a comparator 106 that uses exactly only one reference PG, and also a signal evaluation unit 108 of low-cost design and a signal decision unit 112. Compared with the previous circuit device, circuit device 58 is configured not only to ascertain period length deviations $\Delta p$ of a received signal $r(\tau)$ but also to determine a measurement quality of the ascertained period length deviations $\Delta p$.

Circuit device 58 has, as a subunit of the measuring device, a threshold switch 60 which converts a received signal $r(\tau)$, which is provided by a receiving device of the ultrasonic measurement apparatus and which is attributable, for example, to a reflection of an ultrasonic signal emitted by the ultrasonic measurement apparatus at an object, into a binary signal $b(\tau)$. For example, threshold switch 60 generates a binary signal $b(\tau)$ having the value 1 for a positive value of received signal $r(\tau)$ and the value 0 for a negative value of received signal $r(\tau)$. Threshold switch 60 preferably evaluates received signal $r(\tau)$ with a time-variable significance threshold, as described above.

Binary signal $b(\tau)$ is then outputted to a circuit 62 for ascertaining instantaneous period length deviations $\Delta p$ (instantaneous period length deviation). Circuit 62 may, for example, include components 50 and 52 described below.

Comparator circuit 106 consists, in the case illustrated, of comparator unit 101 and the units for determining the estimated quality, consisting of unit 103 for determining the deviation pattern and of arithmetic unit 107 for determining the raw average deviation quality.

The illustrated unit for quality-level-based signal processing 108 consists by way of example here of only a threshold switch 80 which generates from the raw quantity of the estimated quality the processed estimated quality $\sigma$. In this simple example, the information contained in the error vector $\epsilon$ remains unused in signal processing 108.

The simple decision unit 112 shown in FIG. 4 decides, depending upon signal strength and depending upon the processed estimated quality $\sigma$, whether the speed information v provided for further processing assumes a valid value or is marked as invalid.

For a more detailed understanding of comparison circuit 106 it is pointed out here that the received ultrasonic pulses are analyzed not only with regard to the time variation of the signal strength but in addition with regard to the time variation of the instantaneous period or instantaneous frequency within the pulse. The sequence of period lengths (instantaneous period lengths) of a received pulse thus resembles a fingerprint and reveals a characteristic of both the emitted transmission pulse and the transmission path to the receiver. The transmission path may, for example, be determined by the directional characteristic of the emitting and/or receiving antennas and/or by the objects at which the emitted pulses are reflected on their way to the receiver and their movement relative to one another. If the receiver knows the fingerprint that is characteristic of a transmission scenario, which is represented here by a sequence of reference period lengths, it is possible to detect on the receiver side which scenario existed in the case of a received pulse.

For simplicity, it may be assumed that, in the case of a relative movement, only a time contraction or expansion of a reference sequence proportional to the speed takes place. The circuit illustrated in FIG. 4 shows, using the example of exactly one fingerprint, i.e., a reference sequence consisting of N elements, how such an analysis may be implemented using simple means.

For this analysis, in this concrete embodiment, instantaneous period length deviations $\Delta p$ obtained by measuring unit 62 are transferred in succession with the aid of clock $CLK(\tau)$ to comparator unit 101 in which the difference between the N reference elements of reference sequence 105 and the sequence of measured instantaneous period length deviations is found in each case.

In the block illustrated in 101, the comparison takes place with the aid of a string of N subtraction stages 66 each followed by a result register 64, it being possible to form reference sequence 105 used in this subtraction method, for example, by derivation from the sequence of period lengths of a received signal exemplifying that transmission situation.

An advantage with this type of comparison is that, because of the bandwidth restriction of the expected received signal, large differences in the values do not occur when calculating the difference, as a result of which the registers require only little memory depth and the difference calculation may be implemented by one or few decrementing or incrementing stage(s), that is, for example, by decrementing or incrementing the values, of subsequent result registers in each case. Complex subtraction mechanisms may be dispensed with.

After execution of a number N of cycles by circuit 62, there is provided at the N outputs $\Delta pK(N)$ through $\Delta pK(1)$ of registers 64 the difference of N measured instantaneous period length deviations with respect to the N-stage reference sequence, which is also referred to as a sequence of standardized period length deviations. The average value of the deviation sequence, which is calculated with the aid of addition stage 68 and proportional element 70 operating with the factor 1/N, provides the raw average period length deviation $\Delta pr$.

To calculate the spreads of the standardized period length deviations $\Delta pK(N)$ through $\Delta pK(1)$, average value $\Delta pM$ is subtracted from every standardized period length deviation $\Delta pK(N)$ through $\Delta pK(1)$. This is done by a number N of arithmetic units 72. The differences D(N) through D(1) calculated by arithmetic units 72 are then provided in each case to an arithmetic unit 74 configured to square the respective provided difference D(N) through D(1). This provides a number N of spreads $\sigma(N)$ through $\sigma(1)$.

The unit for evaluating the estimated quality 103 checks, for each element $\Delta pK( \ldots )$, how greatly it deviates from average value $\Delta pr$. For that purpose, in the example shown in FIG. 4, there is determined in 76, for each clock unit, an N-element deviation vector $\epsilon$ which indicates how much each of elements $\Delta pK( \ldots )$ deviates from the average value $\Delta pr$ found per clock cycle. By calculating the difference with 72 and a subsequent evaluation curve 74, each of those deviations is determined. Preferably, that evaluation curve corresponds to the value of the square of the deviation of $\Delta pK( \ldots )$ with respect to $\Delta pr$ previously calculated in 72. As an alternative to the square function, however, the amount or another function may also be used as a measure of the magnitude of the deviation.

In arithmetic unit 107, shown in FIG. 4, for determining raw average deviation quality $\sigma r$, for each clock unit the sum of all elements of the respective deviation vector $\epsilon$ is found and provided to subsequent unit 108. From the number N of deviations $\epsilon(N)$ through $\epsilon(1)$, an evaluation unit 76 is able to produce for each clock cycle a sequence $\epsilon$ with a number of N values. The sequence may then be compared with at least one comparison sequence.

It is pointed out once again that the circuit described with reference to FIG. 4 may be configured to determine an estimated quality, that is, a measure of the spread. With the aid of the estimated quality, a validity decision may be made as to whether standardized period length deviations $\Delta pK(N)$ through $\Delta pK(1)$ are further processed and evaluated. Individual standardized period length deviations $\Delta pK(N)$ through $\Delta pK(1)$ that have too great a spread may be filtered out and kept in an error memory. In that manner it is possible to recognize individual erroneous measurements. The remainder of the standardized period length deviations $\Delta pK(N)$ through $\Delta pK(1)$, which have been established as valid by the filtering operation, may then be used to calculate an optimized average period length deviation having an adequate estimated quality.

Also possible, however, is a quality assessment of the measured values of each clock cycle on the basis of analysis of the error vector $\epsilon$. If, similarly to the case of the instantaneous period lengths described in FIG. 9, there are in the case of the elements of the deviation vector singular outliers of the pairings of instantaneous period length deviation and corresponding reference period length deviation considered in a comparison and represented in the values $\Delta pK( \ldots )$, those pairings are declared "invalid" so that they are no longer considered in the determination of the ultimate average period length deviation $\Delta pr$, which also leads to a reduction of the average deviation quantity $\sigma$ newly calculated in this step on the basis of the corrected values. It is also possible for the set of values provided in a clock cycle to be declared invalid if the number of elements detected as outliers in the respective deviation vector $\epsilon$ is too great.

It is also possible for the circuit described in FIG. 4 to be expanded, on the principle described with reference to FIG. 3, to a plurality of reference sequences and/or for the processing of a plurality of values obtained by measuring devices 61 operating in a time-staggered manner.

Figure 5:
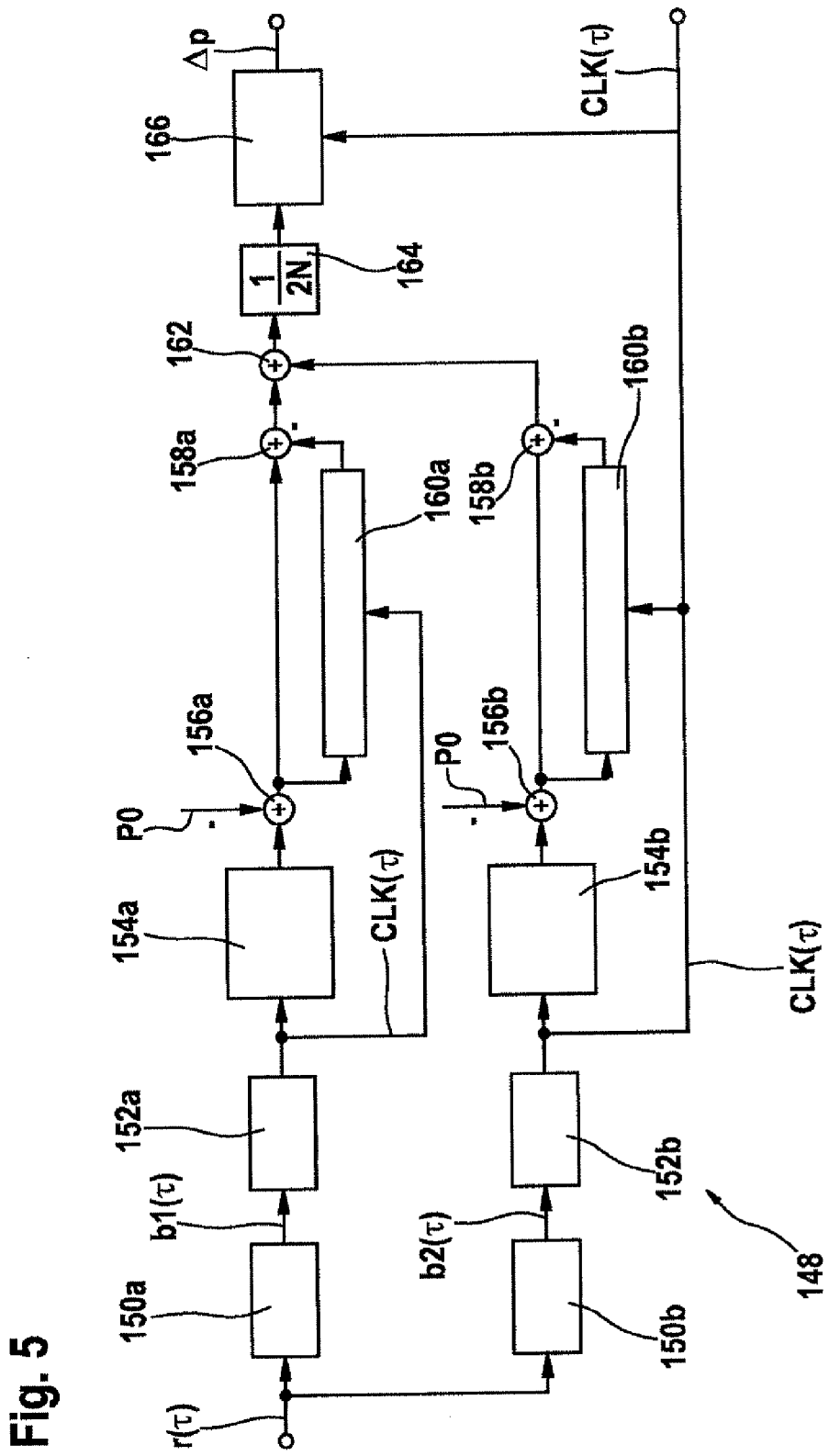
FIG. 5 shows a block diagram to illustrate a circuit device of a third embodiment of the ultrasonic measurement apparatus.

FIG. 5 shows a block diagram to illustrate a circuit device of a fourth embodiment of the ultrasonic measurement apparatus.

Circuit device 148 explained with reference to FIG. 5 is especially well suited to ascertaining an average period length deviation. It is advantageous in this instance if a transmitting device of the ultrasonic measurement apparatus emits a transmission signal of an almost constant signal frequency (i.e., of an almost constant period length P0). In that manner, it is possible to compensate for a comparator.

An analog received signal $r(\tau)$ is provided on a first and a second evaluation path. The first evaluation path has a LH-comparator 150a and the second evaluation path has a HL-comparator 150b at its start. Each of the two comparators 150a and 150b is configured to convert analog received signal $r(\tau)$ into a binary signal $b1(\tau)$ or $b2(\tau)$. At least one of comparators 150a and/or 150b may in this case fulfill the function of a threshold switch with a time-variable significance threshold. Optionally, smoothing units 152a and/or 152b for smoothing binary signals $b1(\tau)$ and $b2(\tau)$ may be connected downstream of comparators 150a and/or 150b. The procedure for evaluating received signal $r(\tau)$ described with reference to FIG. 5 may, however, also take place without smoothing of binary signals $b1(\tau)$ and $b2(\tau)$.

Provision of a clock signal $CLK(\tau)$ may take place by way of smoothed (debounced) binary signal $b1(\tau)$ or $b2(\tau)$. If period length measuring device 154a or 154b operates, for example, over a period length, clock signal CLK(τ) is preferably equal to smoothed binary signal b1(τ) or b2(τ). If period length measuring device 154a or 154b averages over Nm periods, clock signal CLK(τ) may be suitably clocked down by division by Nm.

Smoothed or non-smoothed binary signal b1(τ) is provided to a period length measuring device 154a. The period length measurement may be carried out over a plurality of periods and/or only in one zero-crossing direction. Preferably, period length measuring device 154a is configured to ascertain, on the basis of binary signal b1(τ), time-discrete 8-bit period length values for a positive period length (instantaneous period length).

An arithmetic unit 156a is connected downstream of period length measuring device 154a. With the aid of arithmetic unit 156a it is possible to convert the values determined by period length measuring device 154a for a positive period length into period length deviations (instantaneous period length deviations). For that purpose, a constant, for example the (average) period length P0 of the transmission signal, is subtracted from a period length.

The second evaluation path may also have a period length measuring device 154b and an arithmetic unit 156b. Period length measuring device 154b of the second evaluation path is configured, for example, to determine, on the basis of smoothed or non-smoothed binary signal b2(τ), time-discrete 8-bit period length values for a negative period length. Then, with the aid of the arithmetic unit, the period length P0 of the transmission signal is subtracted from the determined values of the period length to form in each case a value for a negative period length (instantaneous period length).

The positive period length deviations calculated with the aid of period length measuring device 154a and arithmetic unit 156a are outputted both to an arithmetic unit 158a and to an N-fold (delay)-shift register 160a. Shift register 160a is clocked by clock signal CLK(τ). An output of shift register 160a is coupled to a minus input of arithmetic unit 158a. Thus, the determined positive period length deviations are added together by arithmetic unit 158a, with the N-last period length deviation being subtracted in each instance. The value outputted by arithmetic unit 158a therefore corresponds to a sum of the N-last determined positive period length deviations. The value outputted by arithmetic unit 158a is forwarded to an arithmetic unit 162.

The second evaluation path also has an N-fold (delay)-shift register 160b which is clocked by clock signal CLK(τ) and which is connected at its output side to a minus input of an arithmetic unit 156b. In addition, the output of arithmetic unit 156b is coupled to a plus input of arithmetic unit 158b. The value outputted by arithmetic unit 158b therefore corresponds to a sum of the N-last determined negative period length deviations. The output of arithmetic unit 158b is also connected to arithmetic unit 162.

Arithmetic unit 162 adds the sums provided by arithmetic units 158a and 158b to determine an average value of both the information contained in the negative period length deviations and the information contained in the positive period length deviations. At its output side, arithmetic unit 162 is connected to a divider 164 which divides the sum calculated by arithmetic unit 162 by the value 2N. The division carried out by divider 164 is especially advantageous if the value N is equal to $2^a$ where a is a natural number. The evaluation procedure described with reference to FIG. 5 may, however, also be carried out for other values N.

The value calculated by divider 164 may then be outputted to an output memory 166. Output memory 166 also may be clocked by clock signal CLK(τ). Preferably, the period length deviation averaged over N periods is taken over into a subsequent processing unit only if the measurement quality is adequate. Determination of the measurement quality and/or the further processing and evaluation of the period length deviation averaged over N periods and saved in output memory 166 may be carried out in an analogous manner to the examples already described above if, for example, the values stored in shift registers 160 are analyzed with regard to their value spread. This is therefore not discussed here.

In a development of circuit device 148, a plurality of estimators with different N may be used for an object classification or for a cascading of the results.

Figure 6A:
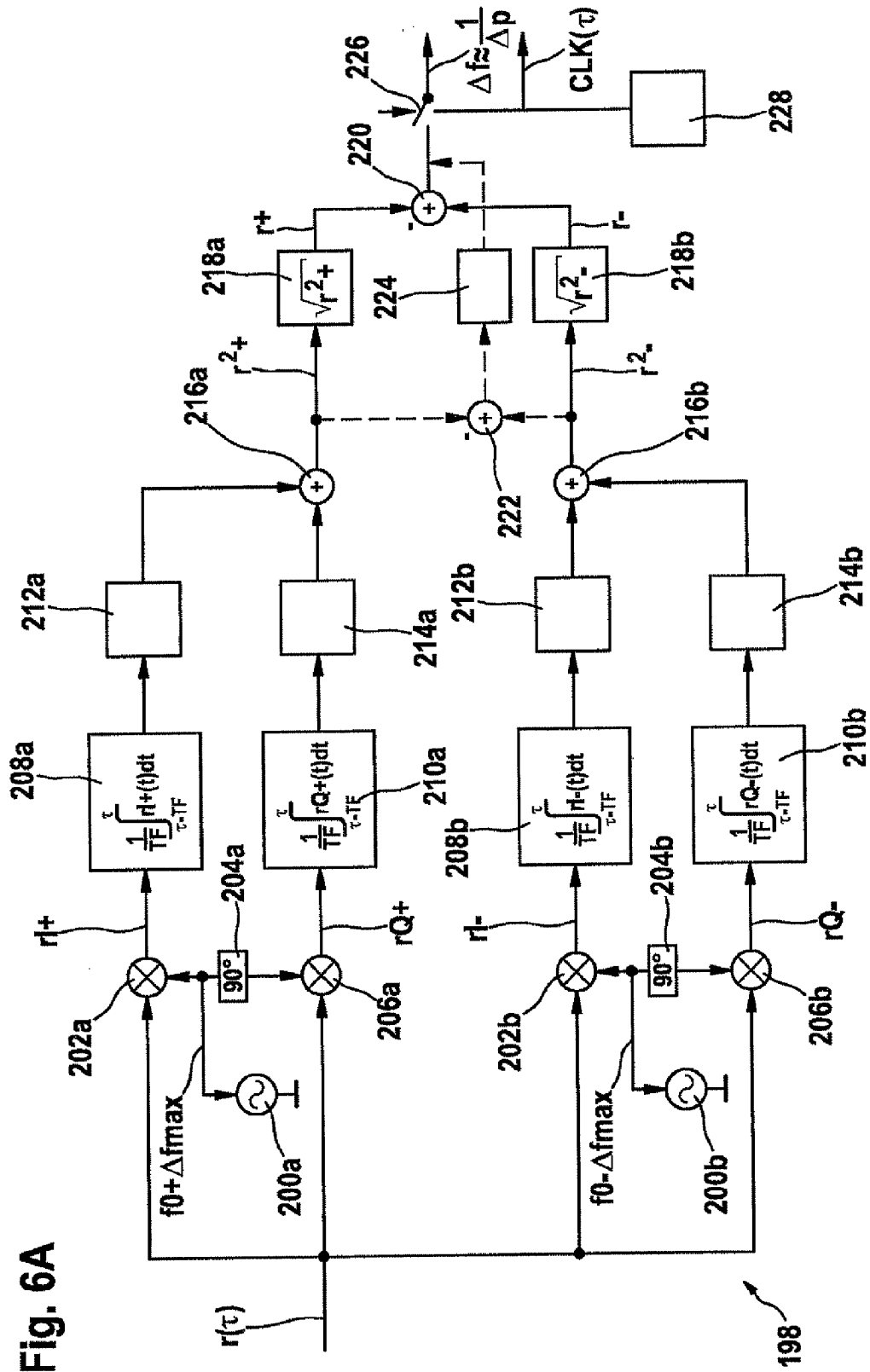
FIGS. 6A and B shows a block diagram and a coordinate system to illustrate a circuit device of a fourth embodiment of the ultrasonic measurement apparatus, FIG. 6A showing the circuit device and FIG. 6B showing a computation step performed by the circuit device.
Figure 6B:
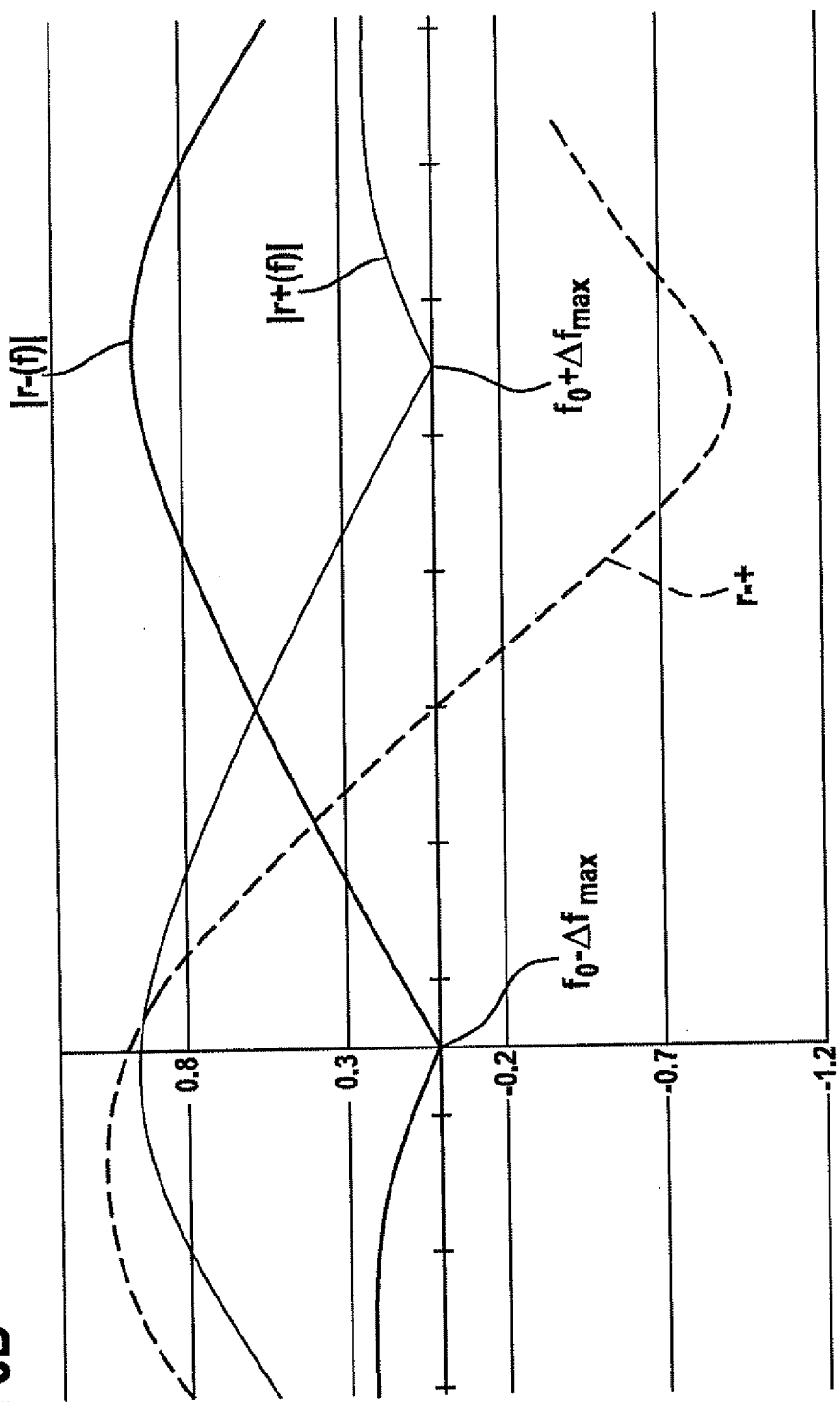

FIGS. 6A and 6B show a block diagram and a coordinate system to illustrate a circuit device of a fourth embodiment of the ultrasonic measurement apparatus, FIG. 6A showing the circuit device and FIG. 6B showing a computation step performed by the circuit device.

Circuit device 198 shown schematically with the aid of FIG. 6A is configured as an FM demodulator for detection of a signal frequency of a dominant carrier signal within a range between a lower frequency f0−Δfmax and an upper frequency f0+Δfmax. FIG. 6A shows, in particular, the circuit architecture of a frequency voltage converter. Both a spectral component of received signal r(τ) having a generated frequency $f_0$+Δfmax and a spectral component of received signal r(τ) having a further generated frequency f0−Δfmax are determined. The difference in the values of the two spectral components is then calculated as a measure of the period length deviation or the frequency deviation.

A received signal r(τ) is provided to the signal input of circuit device 198. Received signal r(τ) is to be examined as to its frequencies with the aid of circuit device 198.

The circuit includes a first and a second reference generator 200a and 200b. First reference generator 200a is configured to generate a signal having a frequency $f_0$+Δfmax and provide it at its signal output. By contrast, second reference generator 200b is configured to output at its output a signal having a frequency $f_0$−Δfmax. The value 2Δfmax thus reflects the bandwidth of the value range within which a relevant frequency of received signal r(τ) is to be determined. Preferably, the frequency f0 is the average frequency at which the transmission signal is emitted. In particular, the transmission signal may be a signal of an almost constant frequency f0.

The signal $f_0$+Δfmax generated by reference generator 200a is mixed with received signal r(τ) by a mixer 202a. The signal thus produced is referred to hereinafter as signal rI+. In addition, the signal having the frequency $f_0$+Δfmax is outputted to a phase rotator 204a and rotated by 90°. Then, the rotated signal is mixed with received signal r(τ) by a mixer 206a to give a signal rQ+.

Correspondingly, the signal of frequency $f_0$−Δfmax generated by reference generator 200b is also mixed with received signal r(τ) by a mixer 202b to give a signal rI−. The signal of frequency $f_0$−Δfmax is similarly outputted to a phase rotator 204b which rotates it by 90°. The rotated signal may be mixed with received signal r(τ) by mixer 206b. In that manner, signal rQ− is produced.

Signals rI+, rQ+, rI− and rQ− are each outputted to a low-pass filter 208a, 210a, 208b or 210b. The formulas for filtering the signals are as follows:

$$\text{(low-pass filter 208a)} \quad \frac{1}{TF}\int_{\tau-TF}^{\tau} rI+(t)\,dt$$

$$\text{(low-pass filter 210}a\text{)} \quad \frac{1}{TF}\int_{\tau-TF}^{\tau} rQ+(t)\,dt$$

$$\text{(low-pass filter 208}b\text{)} \quad \frac{1}{TF}\int_{\tau-TF}^{\tau} rI-(t)\,dt$$

$$\text{(low-pass filter 210}b\text{)} \quad \frac{1}{TF}\int_{\tau-TF}^{\tau} rQ-(t)\,dt$$

In those formulas, TF is preferably the reciprocal of $2\Delta f\max$, i.e.:

$$TF = \frac{1}{2 \cdot \Delta f \max}$$

Filtered signals rI+, rQ+, rI− and rQ− are each outputted to a squaring device 212a, 214a, 212b and 214b. The signals of squaring devices 212a and 214a are then added by an adder 216a. Correspondingly, the signals of squaring devices 212b and 214b are added by an adder 216b. This produces signals $r^2+$ and $r^2-$. An illustration of the transmission functions |r+(f)| and |r−(f)| and their difference r÷− is shown in FIG. 6B.

Signal $r^2+$ is then outputted to a root-determining unit 218a. Signal $r^2-$ is also provided to a root-determining unit 218b. With the aid of an adder 220, the signal provided by root-determining unit 218a is then subtracted from the signal provided by root-determining unit 218b.

The signal provided at the output of adder 220 is approximately proportional to a period length deviation (or to a reciprocal of a frequency deviation). Thus, on the basis of the signal of adder 220, it is possible to determine in a simple manner, by way of a sampling device 226 and a clock generator 228, by what value the instantaneous frequency of received signal r(τ) deviates from frequency f0.

Optionally, signals $r^2+$ and $r^2-$ may also be mixed in a simplified manner by an adder 222 in such a way that signal $r^2+$ is subtracted from signal $r^2-$. It is then possible to generate, by way of a factor-forming unit 224, sampling device 226 and clock generator 228, a signal that is approximately proportional to a frequency deviation.

Despite the relatively great amount of computation work involved with circuit device 198, circuit device 198 has the advantage that the entire curve information is taken into consideration by a plurality of sampling operations within a period. That ensures good noise suppression.

Figure 7A:
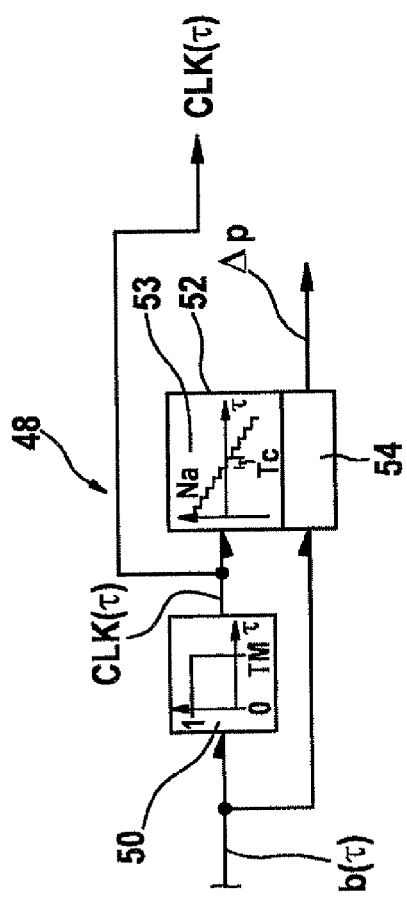
FIG. 7A through C show a block diagram and two coordinate systems to illustrate a circuit device of a fifth embodiment of the ultrasonic measurement apparatus.
Figure 7B:
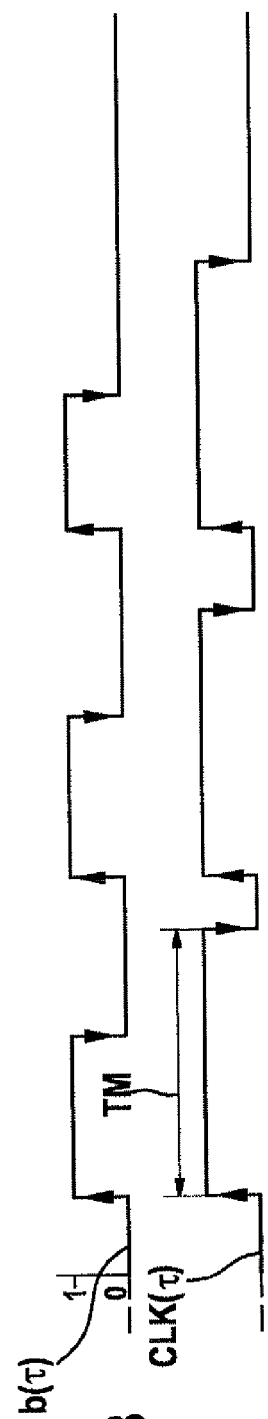

FIGS. 7A and 7B show a block diagram and two coordinate systems to illustrate a circuit device of a fifth embodiment of the ultrasonic measurement apparatus.

It has already been described in the foregoing how received signal r(τ) is converted into a binary signal b(τ). Binary signal b(τ) may also be termed a 1-0 signal (10-signal) since it has a first value for a positive phase of received signal r(τ) and a second value for a negative phase of received signal r(τ). The first value and the second value are the values "1" and "0" (see FIG. 7B with time axis τ as the abscissa).

Binary signal b(τ) is supplied to a monoflop unit 50. Monoflop unit 50 is configured in such a way that, at every detected rising edge from 0 to 1 of binary signal b(τ), it starts a pulse of a clock signal CLK(τ) (as a pulse signal) with a pulse length TM. Clock signal CLK(τ) generated by monoflop unit 50 is also shown in FIG. 7B.

Clock signal CLK(τ) is supplied together with binary signal b(τ) to a preset timer capture unit (PTC unit) 52. PTC unit 52 consists of a timer 53, whose counter reading, preset to the value Na, is decremented beginning at a falling edge of clock signal CLK(τ) with cycle time τc until the counter reading Ne is reached, and a capture register 54 which, at a rising edge of a binary signal b(τ), takes on the current counter reading of timer 53.

Figure 7C:
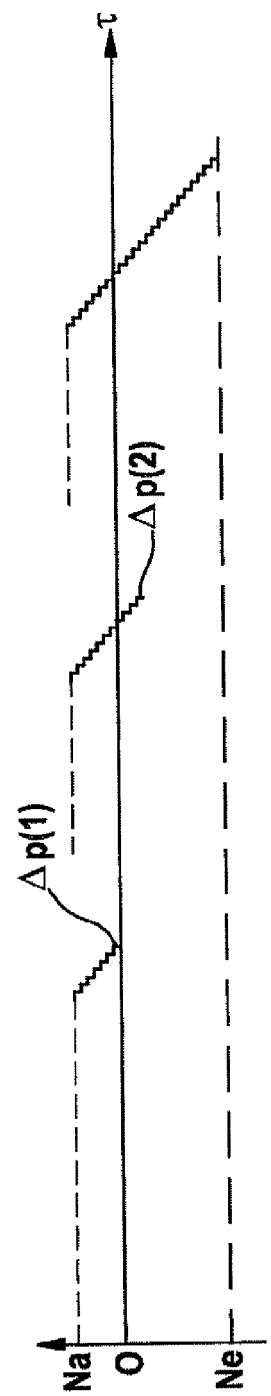

The mode of operation of delay capture architecture 48, that is, of interconnected components 50 through 54, may be understood by reference to the coordinate system of FIGS. 7B and 7C. The abscissa of the coordinate systems gives time axis τ.

Following a level change of binary signal b(τ), a measurement is begun by not reacting to further level changes of binary signal b(τ) for a delay period (pulse length TM). The debouncing thereby achieved acts like a low-pass filter. The delay period may be set to be relatively long. When the delay period has elapsed, the counter of PTC unit 52 is immediately started, which counter is preferably loaded with a value Na preferably corresponding to the number of different speed values, and the clock frequency is preferably regulated in such a way that the counter has the value 0 when exactly the reference period length has elapsed since the start of the delay period TM of the monoflop. In such a configuration, each value of the period length deviation directly corresponds to a speed value without further conversion having been necessary. With the rising edge, the current counter reading of the timer is taken as a measure into capture register 54.

In FIG. 7C, two examples Δp(1) and Δp(2) for period length deviations Δp (instantaneous period length deviations) ascertained by PTC unit 52 are shown. In the first case, the period length to be measured is exactly the reference period length, and therefore Δp(1)=0. In the second case, the period length to be measured is greater than the reference period length, therefore giving with the circuit device shown here Δp(2)>0.

If the counter reaches a predefined final count Ne without having been stopped beforehand because of a detected rising edge of binary signal b(τ), the counting operation is aborted by setting the value for period length deviation Δp to "invalid". Thus, a filtering-out of improbable values (see last example of FIG. 7C) already takes place during the determination of period length deviations Δp.

The current counter reading is read out as a measure of period length deviation Δp at the instant when the next rising level change of binary signal b(τ) is detected, that point in time being at the same time a new starting point for the beginning of the next measurement of period length deviation Δp by triggering of monoflop 50.

The circuit described with reference to FIGS. 7A through 7C may be configured both for a determination of positive period length deviations and for a determination of negative period length deviations. It may also be configured with a different counting direction of the timer and/or with other signs of the counter readings or control signals.

The greater is the pulse length TM, the greater may be the cycle time τc, if the requirement remains the same. The requirements are determined, for example, by the discriminable values of the relative speeds.

Figure 8A:
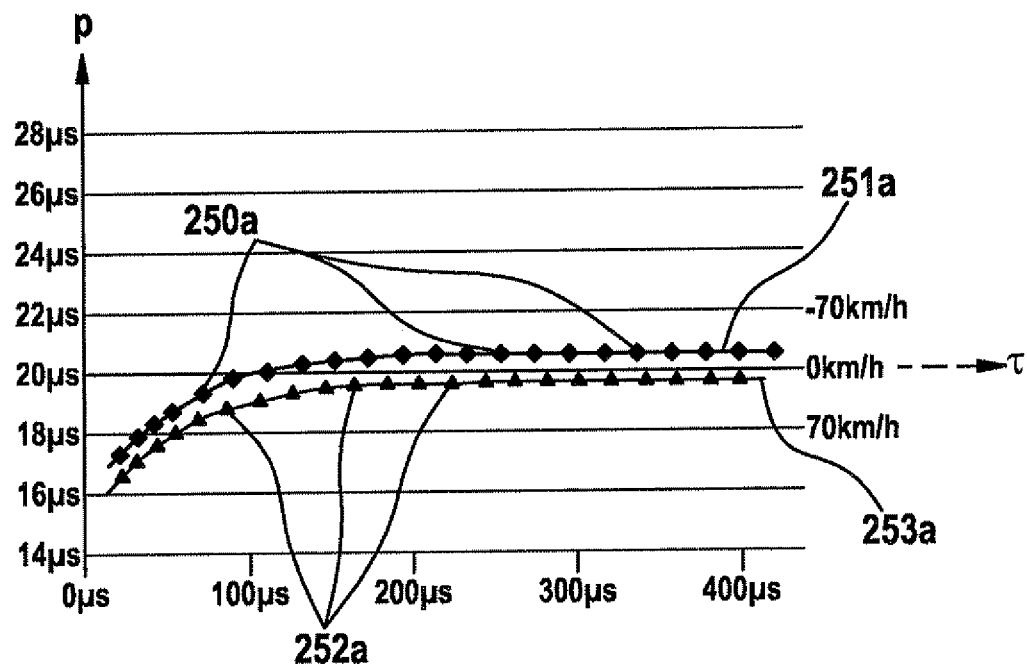
FIGS. 8A and B show two coordinate systems to illustrate a first application example of an embodiment of the ultrasonic measurement apparatus, FIG. 8A showing an evaluation of a period length and FIG. 8B showing an evaluation of a frequency.
Figure 8B:
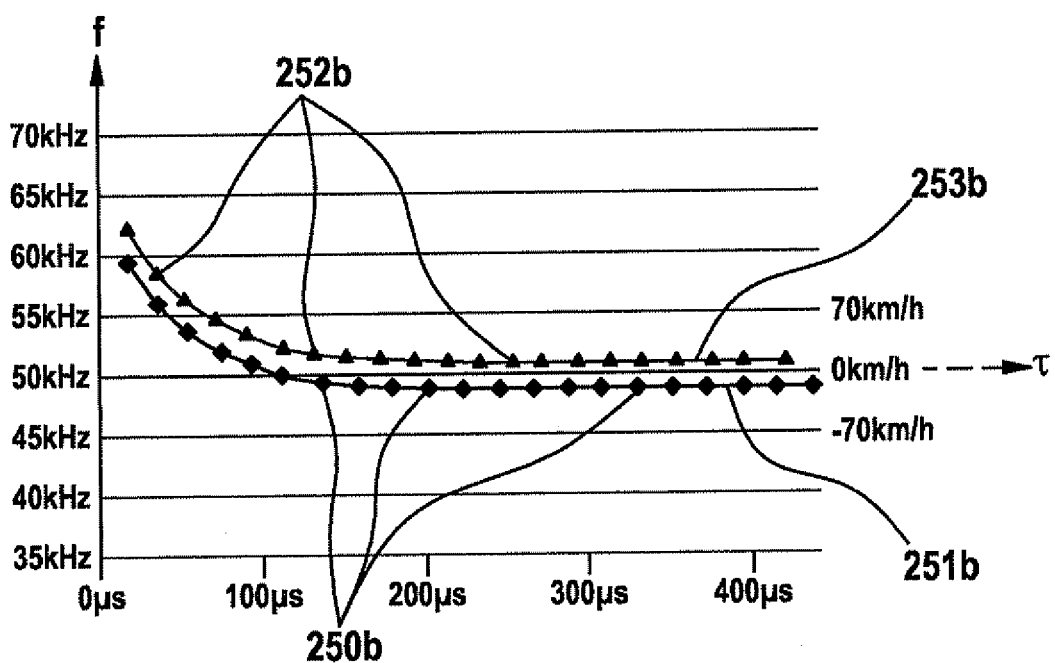

FIGS. 8A and B show two coordinate systems to illustrate a first application example of an embodiment of the ultrasonic measurement apparatus, FIG. 8A showing an evaluation of an instantaneous period length and FIG. 8B showing an evaluation of an instantaneous frequency.

The abscissas of the coordinate systems of FIGS. 8A and B are time axis τ. The ordinate of the coordinate system drawn on the left-hand side of FIG. 8A gives an instantaneous period length p(τ). By contrast, the ordinate of the coordinate system drawn on the left-hand side of FIG. 8B corresponds to an instantaneous frequency f(τ). The ordinates on the right-hand side in each case give by way of example a relative speed at which a frequency shift of approximately 5 kHz or an equivalent period length change of approximately 2 μs of a signal pulse having a signal frequency of approximately 50 kHz corresponding to a period length of approximately 20 μs would be obtained.

Plotted in the coordinate systems are instantaneous period lengths 250a of a transmission signal emitted by the respective ultrasonic measurement apparatus (FIG. 8A) and corresponding instantaneous frequencies 250b of the transmission signal (FIG. 8B). On the basis of instantaneous period lengths 250a and instantaneous frequencies 250b, graphs 251a and 251b, respectively, may be represented. It will be noticed that the deviations of instantaneous period lengths 250a from an average period length (not shown) and the deviations of instantaneous frequencies 250b from an average frequency (not shown) are comparatively great when the intrapulse analysis detects signal changes due to a relative movement of a few km/h. For example, the period length difference within the transmission signal is considerably greater than the smallest resolution of the information sought, which, for example, may be the period length deviation of the echo as a result of the relative speed. That is to say, the transmission signal is subject to variation, either intentionally, for example in the case of a chirp modulation, or unintentionally, for example owing to settling of an ultrasonic transmitter.

Also plotted in FIGS. 8A and B are the values ascertained for instantaneous period lengths 252a and instantaneous frequencies 252b of the (undisturbed) received signal shifted by the transmission propagation time, as may occur, for example, in the case of direct transmission between an ultrasonic transmitter and a receiving device. Those values may be evaluated and represented as graphs 253a and 253b in a simple manner. It will be seen that, in the case of undisturbed transmission, all period lengths 252a and the frequencies 252b lie on graphs 253a and 253b.

On the basis of a comparison of graphs 251a and 253a, or a comparison of graphs 251b and 253b, it is possible to determine, for example, a relative speed of a reflecting object at which the received signal that is to be evaluated is reflected, and/or between ultrasonic transmitter and receiving device, taking into consideration the Doppler shift. In the example illustrated, the relative speed is 8 m/s (about 30 km/h).

FIGS. 8A and B also show that the measurement error is below 2%. Shown in addition is the relative speed at which a frequency shift of about 5 kHz, or an equivalent period length change of about 2 μs, of a transmission pulse having a signal frequency of about 50 kHz, corresponding to a period length of about 20 μs, is produced.

To ascertain the relative movement by evaluation of the Doppler shift, it is advantageous if a signal form of the transmission signal is available as a reference for an evaluation. The determination of the relative movement may be carried out, for example, by calculating a difference of the ascertained instantaneous period lengths 252a and/or instantaneous frequencies 252b of the received signal from reference period lengths and/or reference frequencies. A sequence of period lengths of the received signal may in that manner be standardized to a reference sequence by calculation of the difference. This is described above, for example, with reference to FIG. 4.

Under certain boundary conditions that make it easier, therefore, the average value of the differences corresponds to the relative speed that is to be determined. If various received signal forms are expected on the receiver side after varied transmission signal forms have been emitted, the comparison may be carried out against various references. In that case, various sequences of reference period lengths and/or reference frequencies may be subtracted in parallel time from ascertained instantaneous period lengths 252a and/or instantaneous frequencies 252b. The sequences of reference period lengths and/or reference frequencies may each correspond to one possible signal form of the transmission signal from among a set of various signal forms and/or to the reflection pattern of various object shapes.

If it is desired that differences be sought in the intrapulse variation of the received signals on the basis of a plurality of references, by calculating an average value, the individual spreads and/or an average spread of standardized instantaneous period lengths 252a and/or standardized instantaneous frequencies 252b it is possible to establish in the evaluation to which of the possible signal forms the emitted transmission signal corresponds and/or which object shape has caused an echo.

Using an ultrasonic measurement apparatus configured to establish, by intrapulse analysis of a received signal, which transmission signal of a set of possible transmission signals was previously emitted, it is possible to achieve further system improvements, such as long-runner suppression and/or time-parallel operation.

Correspondingly, comparable requirements to be met by an ultrasonic measurement apparatus also arise if the large differences between individual ascertained instantaneous period lengths 252a and/or instantaneous frequencies 252b of the received signal are attributable not to a transmission pulse with greatly varying instantaneous period lengths 250a and/or instantaneous frequencies 250b, but to a specific pattern of reflecting object points. In this case also, by quasi-simultaneous standardization of ascertained instantaneous period lengths 252a and/or instantaneous frequencies 252b of the received signal with specific sequences of comparison period lengths and/or comparison frequencies, it is possible to assign a specific pattern to ascertained instantaneous period lengths 252a and/or instantaneous frequencies 252b, and hence to the reflecting object points.

Figure 9A:
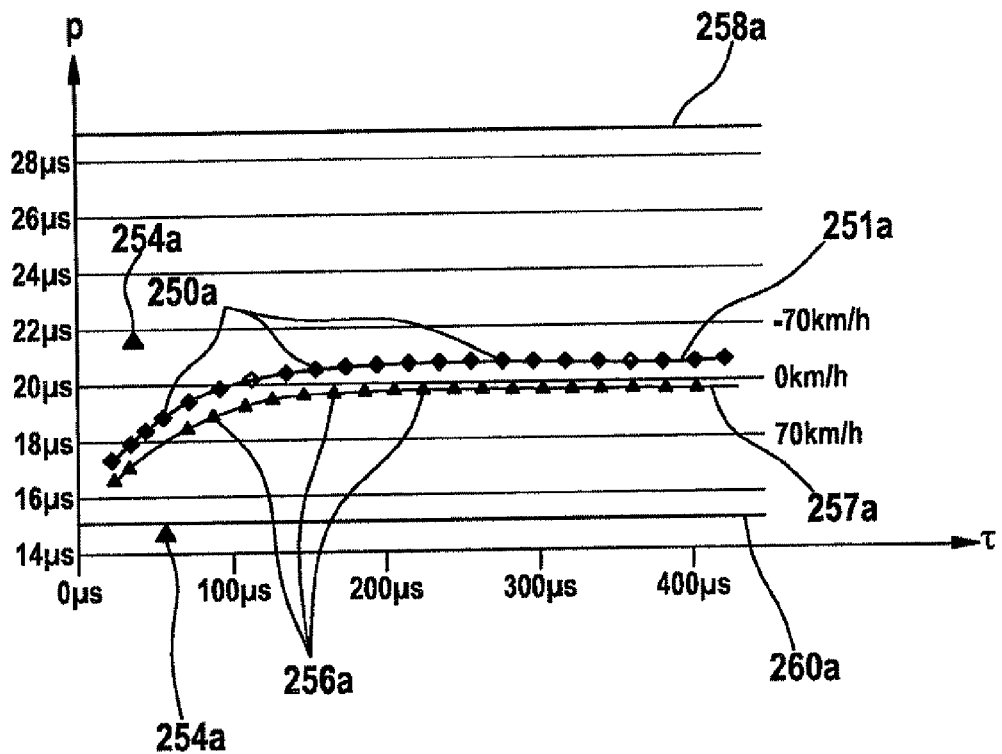
FIGS. 9A and B show two coordinate systems to illustrate a second application example of an embodiment of the ultrasonic measurement apparatus, FIG. 9A showing an evaluation of a period length and FIG. 9B showing an evaluation of a frequency.
Figure 9B:
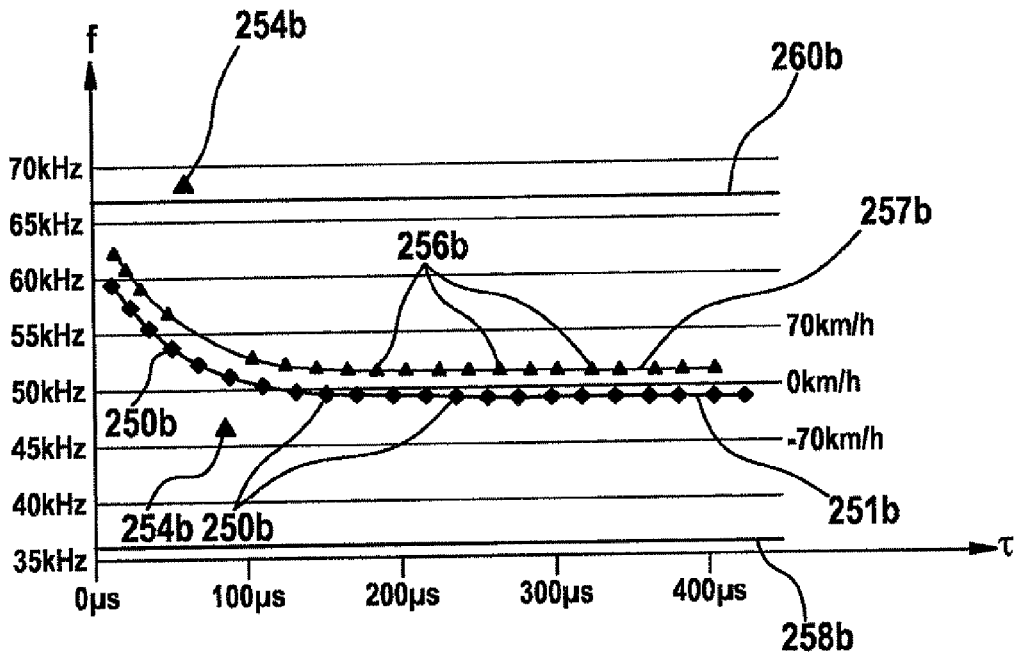

FIGS. 9A and B show two coordinate systems to illustrate a second application example of an embodiment of the ultrasonic measurement apparatus, FIG. 9A showing an evaluation of a period length and FIG. 9B an evaluation of a frequency. The abscissas and ordinates of FIGS. 9A and B correspond to those of FIGS. 8A and B.

Plotted in FIGS. 9A and B are instantaneous period lengths 250a already described above and instantaneous frequencies 250b of the transmission signal together with graphs 251a and 251b produced on the basis of instantaneous period lengths 250a and instantaneous frequencies 250b of the transmission signal. Shown in addition are instantaneous period lengths 256a determined from a received signal and shifted by a transmission propagation time (FIG. 9A), and instantaneous frequencies 256b determined from the received signal (FIG. 9B) which are shifted by the transmission propagation time.

Extreme values 254a and 254b, which lie outside the value ranges defined by limiting curves 258a and 260a, and 258b and 260b, respectively, and which do not occur as a rule in the case of interference-free transmission, may be easily recognized as extreme values 254a and 254b by the described circuits and may be filtered out, for example by suitably configured circuits for measuring the instantaneous period length deviation.

Instantaneous period lengths 256a and/or instantaneous frequencies 256b obtained by the filtering operation may be filtered out as "invalid" by the described methods with the aid of limiting curves 258a and 260a, and 258b and 260b, respectively, and are not taken into consideration in the final calculation. Extreme values 254a and 254b do not, therefore, contribute to a falsification of the result, and therefore it is still possible to establish with a measuring error below 2% that the relative speed is 8 m/s (about 30 km/h).

Equally, extreme values may also be recognized on the basis of their spread with respect to an average value, and may be filtered out as "invalid" and thus remain unconsidered in the calculation that follows.

Instead of the value ranges defined by limiting curves 258a and 260a, or 258b and 260b, spreads of period lengths 256a and/or frequencies 256b standardized to the respective reference may also be evaluated to filter out extreme values 254a and 254b.

Figure 10A:
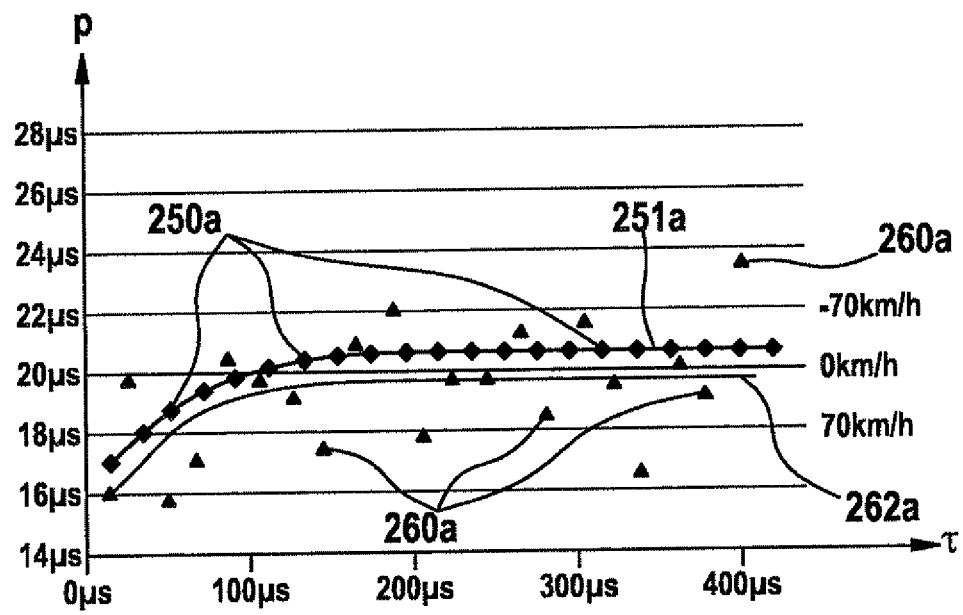
FIGS. 10A and B show two coordinate systems to illustrate a third application example of an embodiment of the ultrasonic measurement apparatus, FIG. 10A showing an evaluation of a period length and FIG. 10B showing an evaluation of a frequency.
Figure 10B:
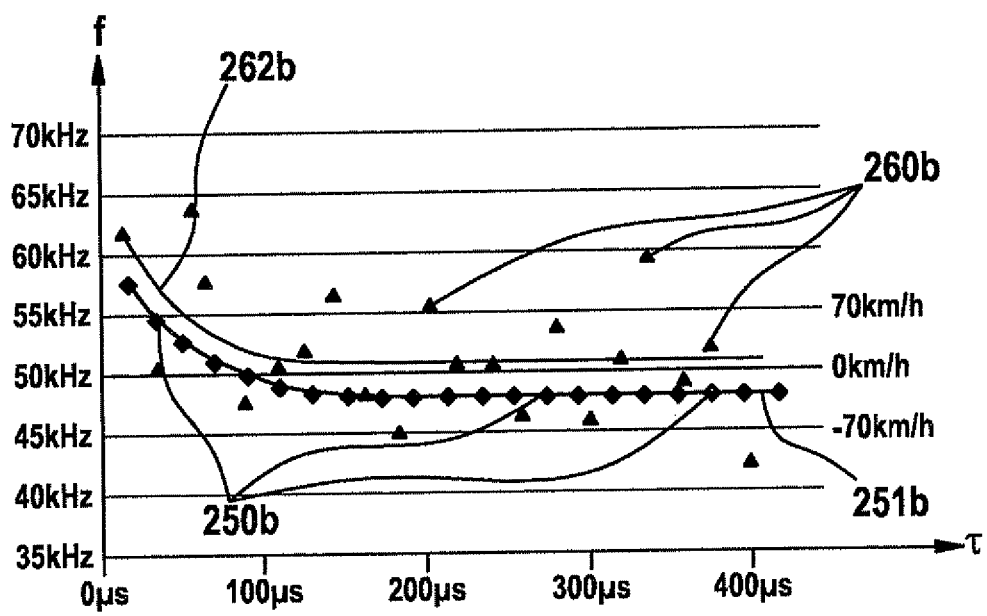

FIGS. 10A and B show two coordinate systems to illustrate a third application example of an embodiment of the ultrasonic measurement apparatus, FIG. 10A showing an evaluation of an instantaneous period length and FIG. 10B an evaluation of an instantaneous frequency. The abscissas and ordinates of FIGS. 10A and B correspond to those of FIGS. 8A and B.

Instantaneous period lengths 250a already described above and instantaneous frequencies 250b of the transmission signal together with graphs 251a and 251b are also plotted in FIGS. 10A and B. Similarly, instantaneous period lengths 260a determined from a received signal and shifted by a transmission propagation time are shown in FIG. 10A, and instantaneous frequencies 260b determined from the received signal and likewise shifted by the transmission propagation time are shown in FIG. 10B.

On considering FIGS. 10A and B, it will be noticed that ascertained instantaneous period lengths 260a and instantaneous frequencies 260b of the received signal have large spreads compared with the previous examples. It is, however, possible to compensate for those large spreads of instantaneous period lengths 260a and instantaneous frequencies 260b of the received signal by calculating optimized average values for period lengths 260a and/or frequencies 260b. Thus, despite the comparatively large spreads of instantaneous period lengths 260a and instantaneous frequencies 260b of the received signal, it is possible to ascertain the relative speed of 8 m/s (about 30 km/h) with a measuring error below 15%.

FIG. 11 shows a coordinate system to illustrate an evaluation of an instantaneous period length in the case of a fourth application example of an embodiment of the ultrasonic measurement apparatus. In this case, the abscissa of the coordinate system is time axis τ. The ordinate of the coordinate system gives a period length p.

In the case of the application example illustrated, an emitted transmission signal with instantaneous period lengths 264, which form a graph 266, is reflected at two object points. The two object points (not shown) are offset from each other by a distance difference of about 28 mm. Owing to the comparatively small distance difference between the two objects, overlaps may occur between the individual reflections of the individual objects. Instantaneous period lengths 268 determined from the received signal and shifted by the propagation time therefore have a relatively great spread.

A characteristic feature of such instances of overlapping is, for example, that the pulse length of the received pulse is considerably longer than that of the emitted pulse. Instantaneous period lengths 268 of such a received signal are therefore preferably evaluated with the aid of an evaluation method in which only the time variation of the period length at the beginning and end of an echo is considered; in this case, the beginning of an echo is preferably delimited by the first time that the received signal exceeds a significance threshold of the signal strength after previously being below the threshold for a fairly long period of time, and the end is preferably delimited by the last time that the received signal exceeded a significance threshold of the signal strength before being below the threshold for a fairly long period of time. In that manner, the overlaps of the individual reflections may be recognized as such. The ultrasonic measurement apparatus used is configured to recognize that it is advantageous to form two graphs 270 and 272 for ascertained period lengths 268 of the received signal. In addition, the ultrasonic measurement apparatus is able to establish the distance between the two objects.

Furthermore, the ultrasonic measurement apparatus is able to establish the relative speed of the objects on the basis of the Doppler shift. In this case, the ultrasonic measurement apparatus recognizes that both objects are moving with the same relative speed of 8 m/s (about 30 km/h). The measuring error in this case is below 12%.

Above, only the acquisition of period lengths and/or frequencies with the aid of intrapulse analysis was discussed in detail. The further processing of the basic information obtained on the basis of the period lengths and/or frequencies, such as, for example, a relative speed, an object surface and/or a transmitted signal form, to provide an image and/or film of the surrounding scene will readily be apparent to one skilled in the art. It is not, therefore, discussed in detail here.

In a further embodiment, vehicle-to-vehicle communication may be rendered possible, which at the same time is suitable for the transmission of vehicle-to-vehicle movement relationships.

For that purpose, an antenna is mounted preferably at each corner of the vehicle. The two front antennas FL (front left) and FR (front right) are, in particular, oriented predominantly in the direction of travel. The two rear antennas RL (rear left) and RR (rear right) are in this case oriented predominantly counter to the direction of travel. The movement relationships of the vehicle may be transmitted, in particular, with the use of pulse modulation, in which case the pulses emitted by each of the antennas are used to modulate different carrier frequencies f(VL), f(VR), f(RL) and f(RR). The relationship of the frequencies (frequency differences) of that set of frequencies to one another is fixed, is known to all the receivers and is to be selected in such a way that realistic movements of vehicles are not shifted or are hardly shifted, for example by a Doppler shift, in such a way that it is no longer possible for the pulses to be clearly assigned to a transmitting location on the vehicle.

The center frequency (or the fundamental or reference frequency) of that set of frequencies is preferably selected to be proportional to the speed of the vehicle so that a receiver of the pulses is able to recognize the speed of the transmitting vehicle. The time width, that is, the pulse duration, of the pulses emitted forward and rearward by a vehicle is preferably proportional to the distances estimated by the vehicle from the vehicle in front and behind, respectively. For a large distance, a large pulse duration is emitted and, for a small distance, a small pulse duration. Preferably, the pulse duration from front and rear is completely independent one from the other. Furthermore, the pulse duration at the left and at the right antenna may also differ if the transmitting vehicle recognizes a different obstacle distance on the right-hand side in the direction of travel than on the left-hand side. On the basis of the pulse duration, road users receiving those pulses are able to recognize the scenario assumed by the transmitting vehicle.

The base distance of the antennas per direction of travel should be as uniform as possible in all vehicles and should preferably be between 130 cm and 150 cm.

The emission of the pulses begins preferably at the same instant for both directions (front and rear). A receiving vehicle is able in that manner to determine the base distance of the antennas of the transmitting vehicle. Alternatively, the emission of the pulses modulating the carrier frequencies could also end at the same instant. In that case, a receiver receiving the modulating pulses at an antenna is able to recognize the spatial relationship between receiving antenna and transmitting vehicle from any difference in the transit time of the pulses. The determination of the movement relationship is validated and refined by simultaneous reception at a further antenna. In that manner, it is possible to determine any partial shadowing between the transmitter and the receiver.

The time interval between the pulses may depend, apart from on the random component which is customary in the communication, on the vehicle's own speed and/or on the relative speeds with respect to surrounding vehicles. When the vehicle's own speed is greater and/or in the case of a high relative speed relative to neighboring objects/vehicles, the pulse interval is smaller in this case than in the case of an almost stationary vehicle surrounded by almost stationary objects/vehicles. In order that a receiver is better able to analyze signal changes due to multiple-path propagation, a double pulse that is closely related in time or a sequence of pulses in close succession may be emitted instead of one continuous pulse.

In a modified form of the vehicle-to-vehicle communication, the left and right pulses of the antennas of a direction of travel may also be in a time relationship to each other that is known to the receiver. In the simplest case, this is able to reduce the demands made on the receiver, since it has to receive on fewer carrier frequencies simultaneously. Equally, a variable time relationship of the pulses to each other and/or a variable relationship of the carrier frequencies may also be used for transmitting information between the vehicles. On the basis of the amplitude of the received pulses and their time relationship to one another, a receiver is able to estimate the distance between the transmitting vehicle and the receiving vehicle.

When ultrasound is used as a transmission medium, it is easy to handle the slow propagation speed using present-day means. Furthermore, many modern automobiles have at least four appropriate antennas in the form of ultrasonic parking sensors at the outer corners. By frequency-multiplexing it is possible to carry out signal encoding. With the aid of correlation methods, the achievable coverage range may be additionally increased. With a suitable configuration of the system, such vehicle-to-vehicle communication is possible in a free field of up to 30 m. In particular, this set of frequency carriers instead of fixed frequencies is able to use a set of frequency chips. That would avoid mutual interference between vehicles traveling at the same speed.

In a refinement of the system described above, it is also possible to take into consideration the transmission timing and the carrier frequencies of nowadays-customary antennas. For example, depending on the available bandwidth in the antennas, transmitting paths and receiving paths, further antennas on different carrier frequencies could be used for additional message transmission. Messages that may be transmitted in that manner are, for example, positions of fixed objects, accidents and/or further road users. It is, of course, also possible for multimedia data, entertainment data and/or information about toll charges to be transmitted in that manner as data not directly relating to traffic flow. Simplifications are possible, for example by installing only one antenna in the direction of travel instead of two. Communication from a vehicle traveling in front to a vehicle traveling behind is quite possible in that case also.

The drifting of ultrasonic signals, which is usual at higher speeds, is non-critical in such a system, since the sound is wafted from the vehicle traveling in front to the vehicle behind, i.e., along the information flow path.

In the example method described above, a frequency mix with a large spacing from the carrier frequency is preferably emitted. It is also possible to achieve in that case a refinement of the measurements in radio-assisted car-to-car projects.

In particular, using the technology described in the above paragraphs, location of road users relative to one another is easily achievable.

What is claimed is:

1. An ultrasonic measurement apparatus for a vehicle, comprising:
 a receiving device configured to receive an ultrasonic signal emitted by at least one of an in-vehicle and external ultrasonic transmitter and to determine and provide a measurement sequence relating to a time variation of period lengths of the received ultrasonic signal;
 a comparison device on which at least one reference sequence is stored and which is configured to compare the determined measurement sequence with the at least one reference sequence and to determine a comparison information item relating to a deviation of the determined measurement sequence from the at least one reference sequence; and
 an evaluation device configured to determine, based on the determined comparison information item, at least one of an information item relating to a signal form transmitted by the ultrasonic transmitter, a relative speed between the receiving device and the external ultrasonic transmitter, a relative speed of at least one reflecting object situated in a transmission path between the receiving device and the ultrasonic transmitter, and a shape feature of the at least one reflecting object;
 wherein the measurement sequence determined by the receiving device includes at least one of a sequence of positive period lengths of the ultrasonic signal, a sequence of negative period lengths of the ultrasonic signal, a sequence of positive period length deviations of the ultrasonic signal from a reference period length, a sequence of negative period length deviations of the ultrasonic signal from a reference period length, a sequence of frequencies of the ultrasonic signal, and a sequence of frequency deviations of the ultrasonic signal from a reference frequency.

2. The ultrasonic measurement apparatus as recited in claim 1, wherein the receiving device includes a threshold switch with a predefined significance threshold, which is configured to filter the ultrasonic signal in such a manner that the measurement sequence is determined based on signal regions of the ultrasonic signal having an intensity above the significance threshold and filtering out signal regions of the ultrasonic signal having an intensity below the significance threshold.

3. The ultrasonic measurement apparatus as recited in claim 1, wherein the receiving device includes a binary signal output device which is configured to convert at least regions of the received ultrasonic signal into a binary signal, and wherein the receiving device includes at least one time-measuring unit which is configured to determine, based on the binary signal provided, at least one of the sequence of positive period length deviations and the sequence of negative period length deviations from the reference period length as a measurement sequence.

4. The ultrasonic measurement apparatus as recited in claim 1, wherein the receiving device includes a first time-measuring unit and a second time-measuring unit, and wherein the first time-measuring unit is configured to ascertain the positive period length deviation from the reference period length and the second time-measuring unit is configured to ascertain the negative period length deviation from the reference period length.

5. The ultrasonic measurement apparatus as recited in claim 1, wherein at least a first reference sequence relating to a first comparison shape feature of the at least one reflecting object and a second reference sequence relating to a second comparison shape feature of the at least one reflecting object are stored on the comparison device.

6. The ultrasonic measurement apparatus as recited in claim 1, wherein the evaluation device is configured to determine, based on the time variation of the period length at the beginning and end of an echo, at least a first relative speed and a second relative speed, deviating from the first relative speed, of the at least one object, and wherein the evaluation device is additionally configured to recognize, in a determination of the first relative speed and the deviating second relative speed, that during a time interval corresponding to the partial sequence an ultrasonic signal reflected toward at least two different objects is received by the receiving device.

7. A method for evaluating an ultrasonic signal emitted by an in-vehicle and/or external ultrasonic transmitter, comprising:
   determining a measurement sequence relating to a time variation of period lengths of a received ultrasonic signal;
   comparing the determined measurement sequence with at least one reference sequence, wherein a comparison information item relating to a deviation of the measurement sequence from the at least one reference sequence is determined; and
   determining at least one of an information item relating to a signal form transmitted by the ultrasonic transmitter, a relative speed between the receiving device and the external ultrasonic transmitter, a relative speed of at least one reflecting object situated in a transmission path between the receiving device and the ultrasonic transmitter, and a shape feature of the at least one reflecting object, taking the determined comparison information item into consideration;
   wherein the measurement sequence determined by the receiving device includes at least one of a sequence of positive period lengths of the ultrasonic signal, a sequence of negative period lengths of the ultrasonic signal, a sequence of positive period length deviations of the ultrasonic signal from a reference period length, a sequence of negative period length deviations of the ultrasonic signal from a reference period length, a sequence of frequencies of the ultrasonic signal, and a sequence of frequency deviations of the ultrasonic signal from a reference frequency.

8. The method as recited in claim 7, wherein at least one of the following is determined as the measurement sequence: a sequence of positive period lengths of the ultrasonic signal, a sequence of negative period lengths of the ultrasonic signal, a sequence of positive period length deviations of the ultrasonic signal from a reference period length, a sequence of negative period length deviations of the ultrasonic signal from a reference period length, a sequence of frequencies of the ultrasonic signal, and a sequence of frequency deviations of the ultrasonic signal from a reference frequency.

9. The method as recited in claim 7, wherein if, based only on the time variation of the period length at the beginning and end of an echo, at least a first relative speed and a second relative speed, deviating from the first relative speed, of the at least one object is determined, it is determined that during a time interval corresponding to the partial sequence an ultrasonic signal reflected toward at least two different external objects is received.

* * * * *